United States Patent
Ahuja et al.

(10) Patent No.: US 10,958,519 B2
(45) Date of Patent: *Mar. 23, 2021

(54) DYNAMIC, LOAD-BASED, AUTO-SCALING NETWORK SECURITY MICROSERVICES ARCHITECTURE

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US)

(73) Assignee: ShieldX Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/696,679

(22) Filed: Nov. 26, 2019

(65) Prior Publication Data

US 2020/0195503 A1 Jun. 18, 2020

Related U.S. Application Data

(63) Continuation of application No. 16/174,884, filed on Oct. 30, 2018, now Pat. No. 10,498,601, which is a (Continued)

(51) Int. Cl.
*H04L 12/24* (2006.01)
*H04L 29/08* (2006.01)
(Continued)

(52) U.S. Cl.
CPC ........ *H04L 41/0816* (2013.01); *G06F 21/554* (2013.01); *H04L 41/08* (2013.01);
(Continued)

(58) Field of Classification Search
CPC .............. H04L 9/0836; H04L 12/2411; H04L 29/08513; H04L 41/0816; H04L 63/0227;
(Continued)

(56) References Cited

U.S. PATENT DOCUMENTS 9,467,476 B1 10/2016 Shieh et al.
2010/0299437 A1 11/2010 Moore
(Continued)

OTHER PUBLICATIONS

Advisory Action from U.S. Appl. No. 15/182,573, dated Mar. 21, 2017, 3 pages.
(Continued)

*Primary Examiner* — El Hadji M Sall
(74) *Attorney, Agent, or Firm* — Nicholson De Vos Webster & Elliott LLP

(57) ABSTRACT

System, methods, and apparatuses used to monitor network traffic of a datacenter and report security threats are described. For example, one embodiment selects a first microservice of a first hierarchy, configures the microservices of a second lower-level hierarchy to remove the first microservice from load balancing decisions to the first hierarchy, moves the first microservice to another server, configures data plane connectivity to the first microservice to reflect a change in server, and configures the microservices of the second hierarchy to include the first microservice in load balancing decisions to the first hierarchy.

20 Claims, 27 Drawing Sheets

1004 – Create a new microservice to perform a security service

1006 – Configure data plane to enable data connectivity between the new microservice and the microservices of higher and lower hierarchy levels.

1008 – Configure microservices of the lower hierarchy level to include the new microservice in selection mechanism for load balancing to higher level security services.

Related U.S. Application Data continuation of application No. 15/194,561, filed on Jun. 27, 2016, now Pat. No. 10,148,504, which is a continuation of application No. 15/182,573, filed on Jun. 14, 2016, now Pat. No. 9,716,617.

(51) Int. Cl.
*G06F 21/55* (2013.01)
*H04L 29/06* (2006.01)

(52) U.S. Cl.
CPC ...... *H04L 41/0803* (2013.01); *H04L 63/0227* (2013.01); *H04L 63/101* (2013.01); *H04L 63/20* (2013.01); *H04L 67/1002* (2013.01); *H04L 67/1031* (2013.01); *H04L 67/16* (2013.01); *H04L 63/1408* (2013.01)

(58) Field of Classification Search
CPC . H04L 63/20; H04L 41/0803; H04L 67/1002; H04L 67/16; H04L 67/1031; H04L 41/08; H04L 63/1408
See application file for complete search history.

(56) References Cited

U.S. PATENT DOCUMENTS

| | | |
|---|---|---|
| 2016/0094384 A1 | 3/2016 | Jain et al. |
| 2016/0112475 A1 | 4/2016 | Lawson et al. |
| 2016/0112521 A1 | 4/2016 | Lawson et al. |
| 2016/0124742 A1* | 5/2016 | Rangasamy ............ H04L 41/00 717/103 |
| 2016/0127199 A1 | 5/2016 | Ding et al. |
| 2017/0230349 A1* | 8/2017 | Gaur ...................... G06F 21/57 |
| 2018/0152534 A1 | 5/2018 | Kristiansson et al. |

OTHER PUBLICATIONS

Final Office Action from U.S. Appl. No. 15/182,573, dated Jan. 9, 2017, 8 pages.
Final Office Action from U.S. Appl. No. 15/194,561, dated Feb. 12, 2018, 5 pages.
International Preliminary Report on Patentability, PCT App. No. PCT/US2016/058512, dated Dec. 27, 2018, 9 pages.
International Search Report and Written Opinion for Application No. PCT/US2016/058512, dated Mar. 8, 2017, 11 pages.
Lewis et al., "Microservices," Mar. 16, 2014, XP055347623, downloaded from the Internet https://web.archive.org/web/20140316080617/http:/martinfowler.com/articles/microservices.html on Feb. 20, 2017, 8 pages.
Non-Final Office Action from U.S. Appl. No. 15/182,573, dated Aug. 25, 2016, 9 pages.
Non-Final Office Action from U.S. Appl. No. 15/194,561, dated Sep. 8, 2017, 10 pages.
Non-Final Office Action, U.S. Appl. No. 16/174,884, dated Mar. 21, 2019, 11 pages.
Notice of Allowance from U.S. Appl. No. 15/182,573, dated Jun. 8, 2017, 15 pages.
Notice of Allowance from U.S. Appl. No. 15/194,561, dated Aug. 1, 2018, 11 pages.
Notice of Allowance, U.S. Appl. No. 16/174,884, dated Jul. 17, 2019, 7 pages.
Office Action, EP App. No. 16794811.6, dated Feb. 21, 2020, 8 pages.
Toffetti et al., "An Architecture for Self-managing Microservices," International Workshop on Automated Incident Management in Cloud (AIMC'15), in conjunction with EuroSys'15, the European Conference on Computer Systems, Apr. 21, 2015, pp. 19-23.
Office Action, EP App. No. 16794811.6, Jan. 15, 2021, 7 pages.

\* cited by examiner

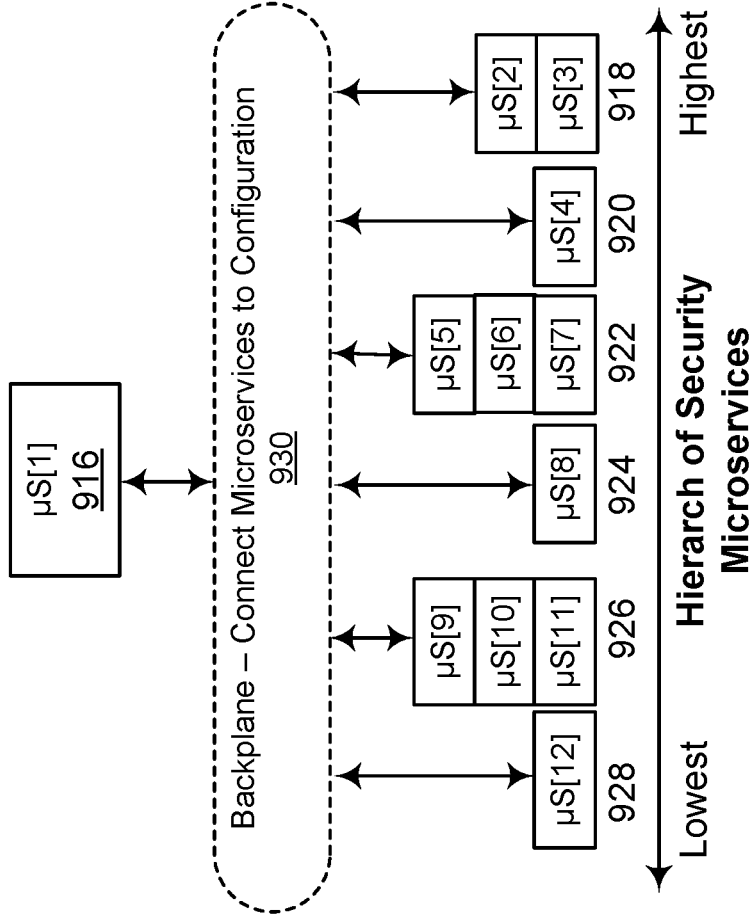
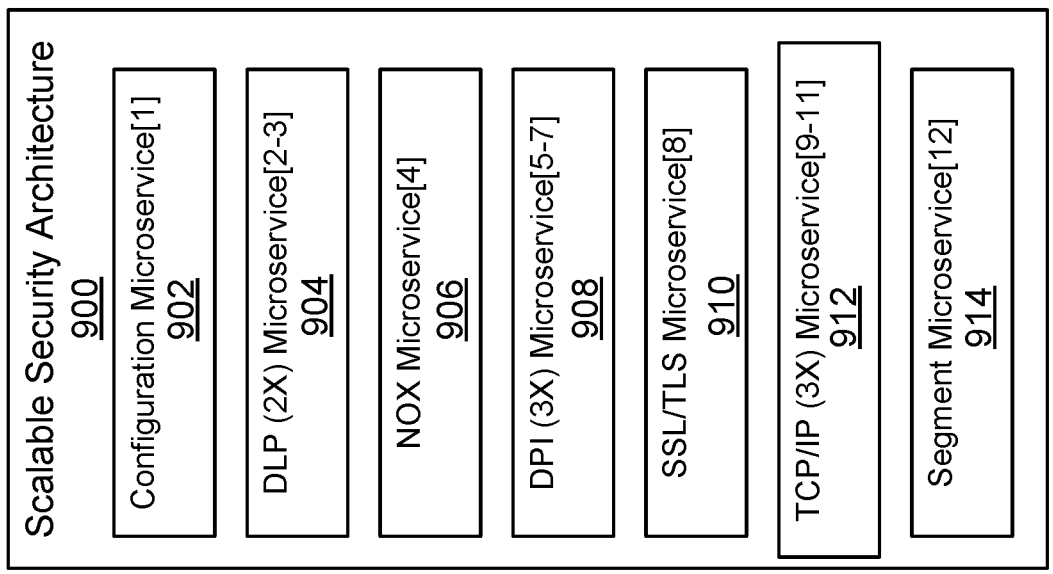
FIG. 9

DYNAMIC, LOAD-BASED, AUTO-SCALING NETWORK SECURITY MICROSERVICES ARCHITECTURE

CROSS-REFERENCE TO RELATED APPLICATIONS

This application is a continuation of and claims priority to U.S. patent application Ser. No. 16/174,884, filed on Oct. 30, 2018, which application is a continuation of and claims priority to U.S. patent application Ser. No. 15/194,561, filed on Jun. 27, 2016, now U.S. Pat. No. 10,148,504, which application is a continuation of and claims priority to U.S. patent application Ser. No. 15/182,573, filed on Jun. 14, 2016, now U.S. Pat. No. 9,716,617, which are hereby incorporated by reference in their entirety.

TECHNICAL FIELD

Embodiments described herein generally relate to network security. In particular, embodiments described generally relate to a dynamic, load-based, auto-scaling network security microservices architecture.

BACKGROUND INFORMATION

The breadth and complexity of network security threats targeting modern data centers is far and wide, and ever growing. The list includes: Worms, Spoofing, Sniffing, Hijacking, Trojan Horses, Denial of Service attacks, and Phishing, to name but a few network security threats.

Network security solutions that rely on deploying network security appliances throughout the datacenter suffer from a number of shortcomings. It may not be economically or administratively feasible to provide the number of such appliances that would be needed to monitor high traffic volumes. Scaling the number of appliances out or in may also be complex and time-consuming. It may not be feasible to provide sufficient network port density to allow the appliances to access various parts of the datacenter network. It may also be difficult to keep the appliances up to date with the latest threat signatures. Deploying such appliances may be difficult, especially, for example, to protect a cloud computing environment.

BRIEF DESCRIPTION OF THE DRAWINGS

The various advantages of the embodiments disclosed herein will become apparent to one skilled in the art by reading the following specification and appended claims, and by referencing the following drawings, in which:

FIG. 9 illustrates meeting an arbitrary scale-out requirement by scaling out a microservice according to an embodiment;

DETAILED DESCRIPTION

In the following description, numerous specific details are set forth. However, it is understood that embodiments of the disclosure may be practiced without these specific details. In other instances, circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Detailed herein are embodiments of datacenter network security detection and protection that allow for configuration, scaling out or in according to traffic load, easy deployment, and/or automatic updating with new security policies.

Figure 2:
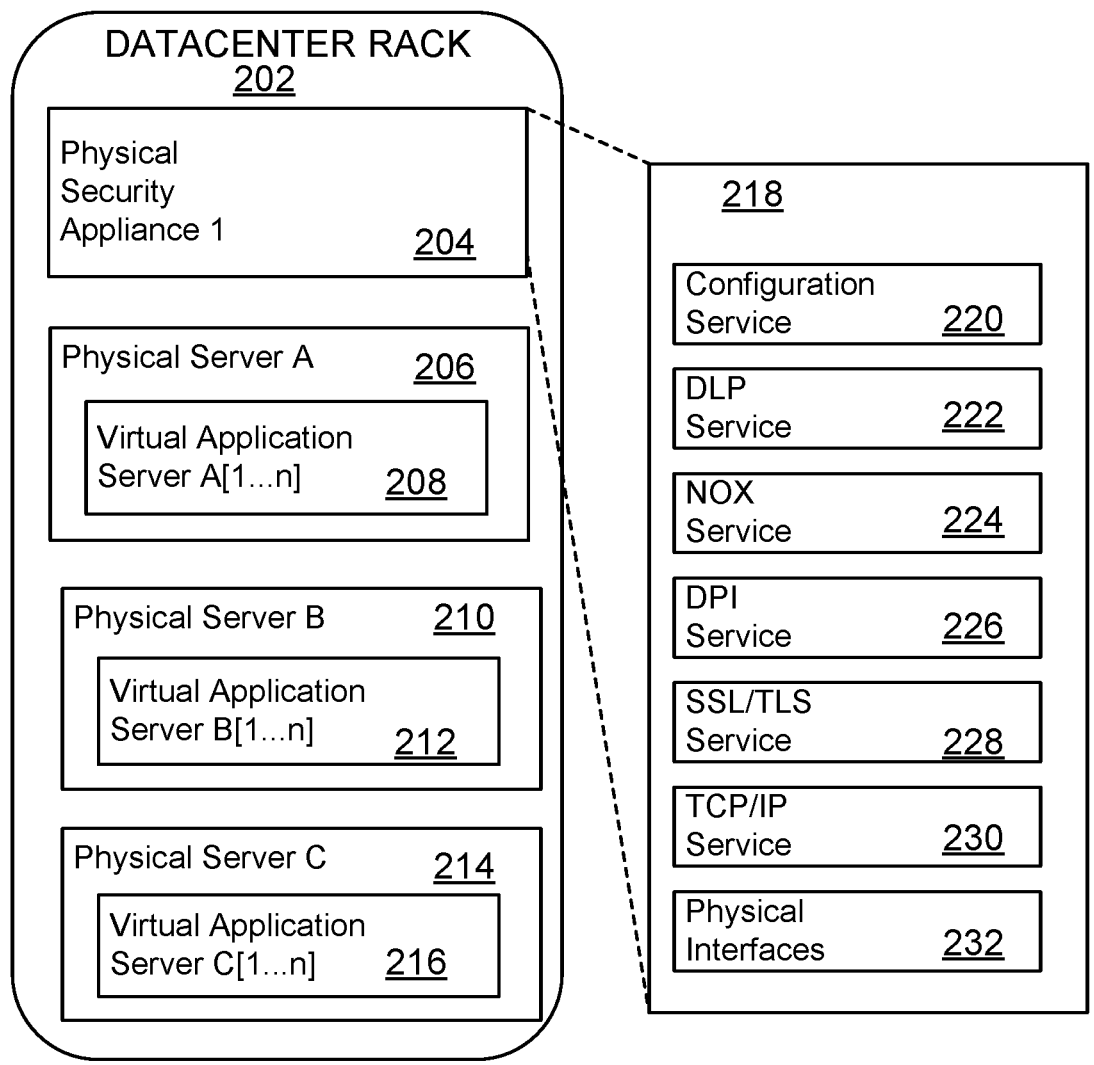
FIG. 2 illustrates an embodiment of a method for deployment of security services within a datacenter.

FIG. 2 illustrates a deployment of security services within a datacenter according to an embodiment. The datacenter consists of a deployed security appliance that provides a hierarchy of security services to physical servers. As shown, datacenter rack 202 includes a physical security appliance 204 and three physical servers 206, 210, and 214, the physical servers including virtual application servers, 208, 212, and 216, each of which hosts virtual applications 1 through n. The physical security appliance 204 provides services 218, including, but not limited to, interface services 232, TCP/IP (L3-L4 Protocol) services 230, SSL/TLS (encryption/decryption) services 228, DPI (Deep packet Inspection) services 226, NOX (Network Object Extraction) services 224, DLP (Data Leakage Protection) services 222, and configuration services 220. Additional services, such as e-mail processing services, intrusion detection services and other services, may be deployed.

Figure 3:
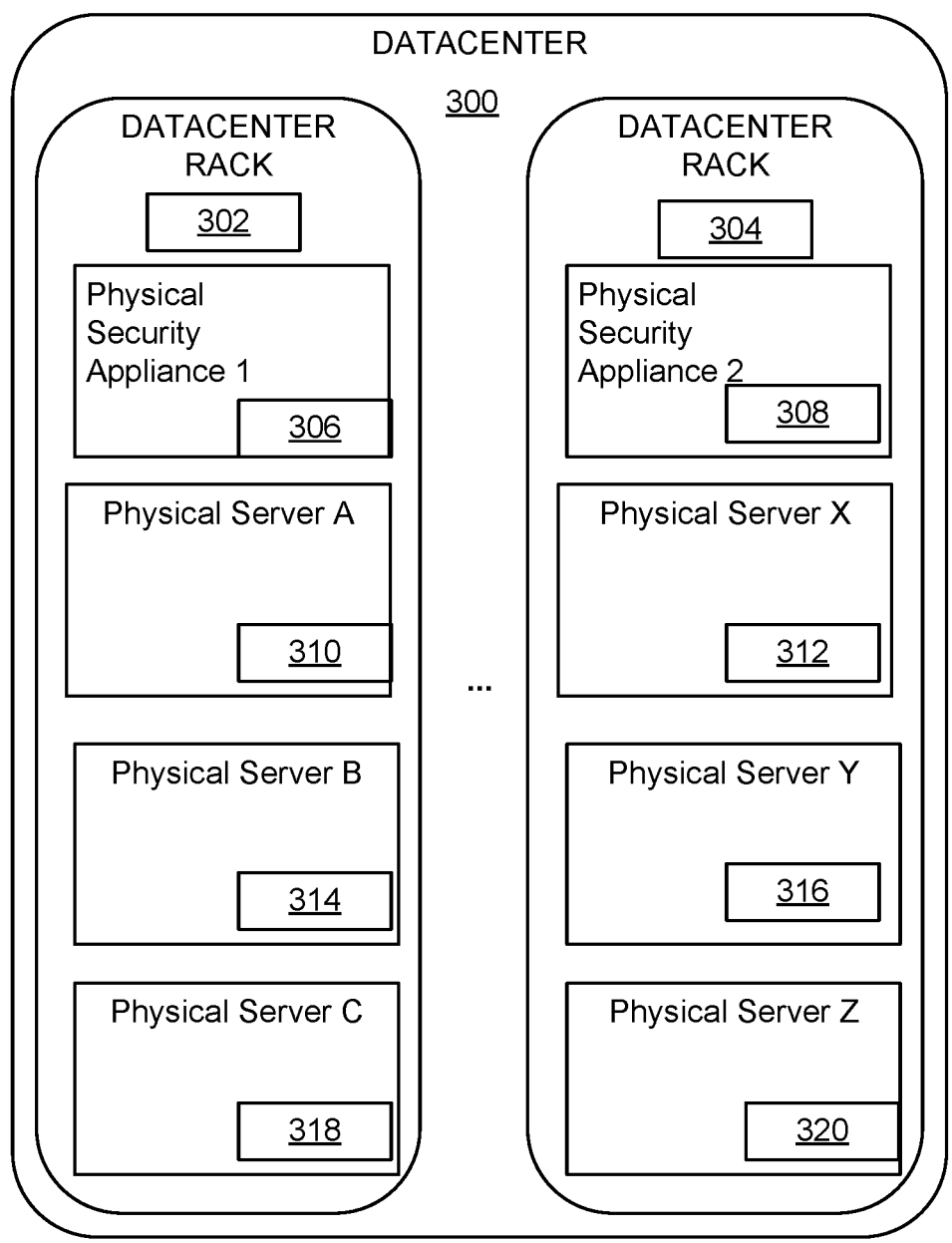
FIG. 3 illustrates an embodiment of a datacenter including datacenter racks to host a physical server or a physical security appliance.

FIG. 3 is another illustration of an embodiment of a datacenter including datacenter racks. As shown, datacenter 300 includes a variable number of datacenter racks, although only two are shown: 302 and 304. As illustrated, datacenter rack 302 includes a physical security appliance 306 and three physical servers A, B, and C, labeled as 310, 314, and 318, respectively. Likewise, datacenter rack 304 includes a physical security appliance 308 and three physical servers X, Y, and Z, labeled as 312, 316, and 320.

The connectivity of security services can be thought of as a security hierarchy in view of the sequential analysis performed and the general requirement to perform lower-level analysis prior to higher-level analysis. This concept is similar to the requirement that network switches and other equipment perform processing at one level (e.g., Ethernet) of the OSI stack before proceeding to a higher level (e.g., IP). As an example, TCP/IP processing will reassemble streams transported by applications. NOX processing relies upon the output of reassembled streams and does not generally operate on single packets. Likewise, encrypted or compressed streams must be decrypted or decompressed respectively prior to NOX processing. Analyses that can be performed on the same source data are neither required to occur concurrently nor in any specific order.

A general property of this security hierarchy is that each layer of the hierarchy accepts serviced data from a lower hierarchy level, processes the accepted data, and submits the processed data to a higher level of the hierarchy. In some embodiments, at each level of the hierarchy, a rule may determine that particular network traffic conforms to or violates a security policy and terminate processing by returning an "accept" or "reject" response to the lower levels of hierarchy. Such rules may be configured and may also be grouped into policies. Under some circumstances (such as detecting that encryption is not used), a layer of the hierarchy may be skipped and data provided to a higher level in the hierarchy. As an example, a rule may be configured to disallow encrypted traffic between two networks. If the result of processing the reassembled TCP/IP packets indicates the presence of encrypted payloads, a "reject" message would be transmitted to the TCP/IP layer causing the traffic to be discontinued.

Figure 4:
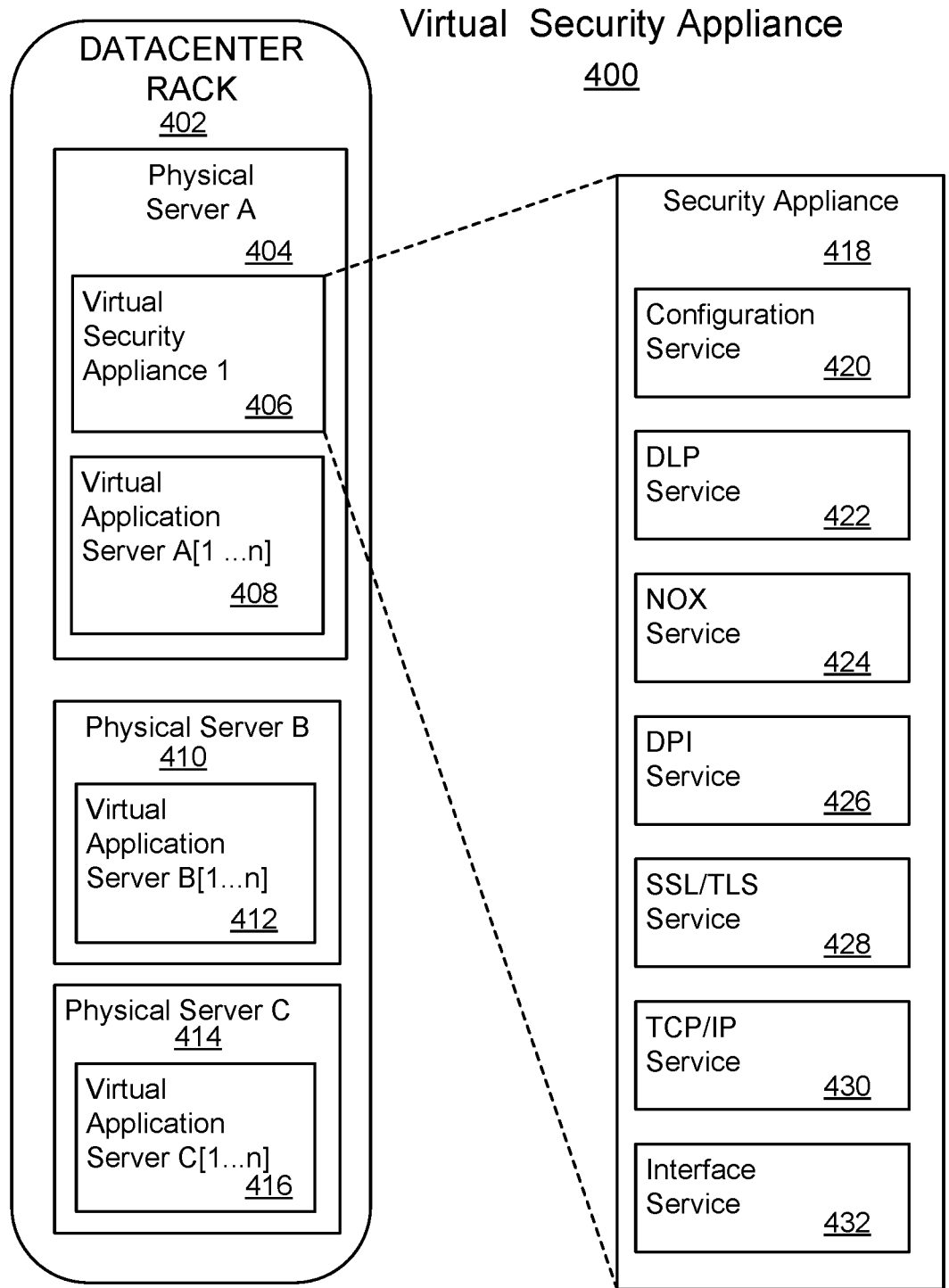
FIG. 4 illustrates an embodiment of a virtual security appliance.

FIG. 4 illustrates a deployment of security services within a datacenter rack according to an embodiment. The datacenter rack 402 of virtual security appliance 400 consists of a deployed security appliance that provides a hierarchy of security services to physical servers. As shown, datacenter rack 402 includes a physical server 404, which provides virtual security appliance 1 406 and virtual application server A 408. Datacenter rack 402 also provides physical server B 410, which provides virtual application server B 412, and physical server C 414, which provides virtual application server C 416. The physical server A 404 provides security appliance services 418, including, but not limited to, interface services 432, TCP/IP (L3-L4 Protocol) services 430, SSL/TLS (encryption/decryption) services 428, DPI (Deep packet Inspection) services 426, NOX (Network Object Extraction) services 424, DLP (Data Leakage Protection) services 422, and configuration services 420. Additional services, such as e-mail processing services, intrusion detection services and other services, may be deployed.

Figure 5:
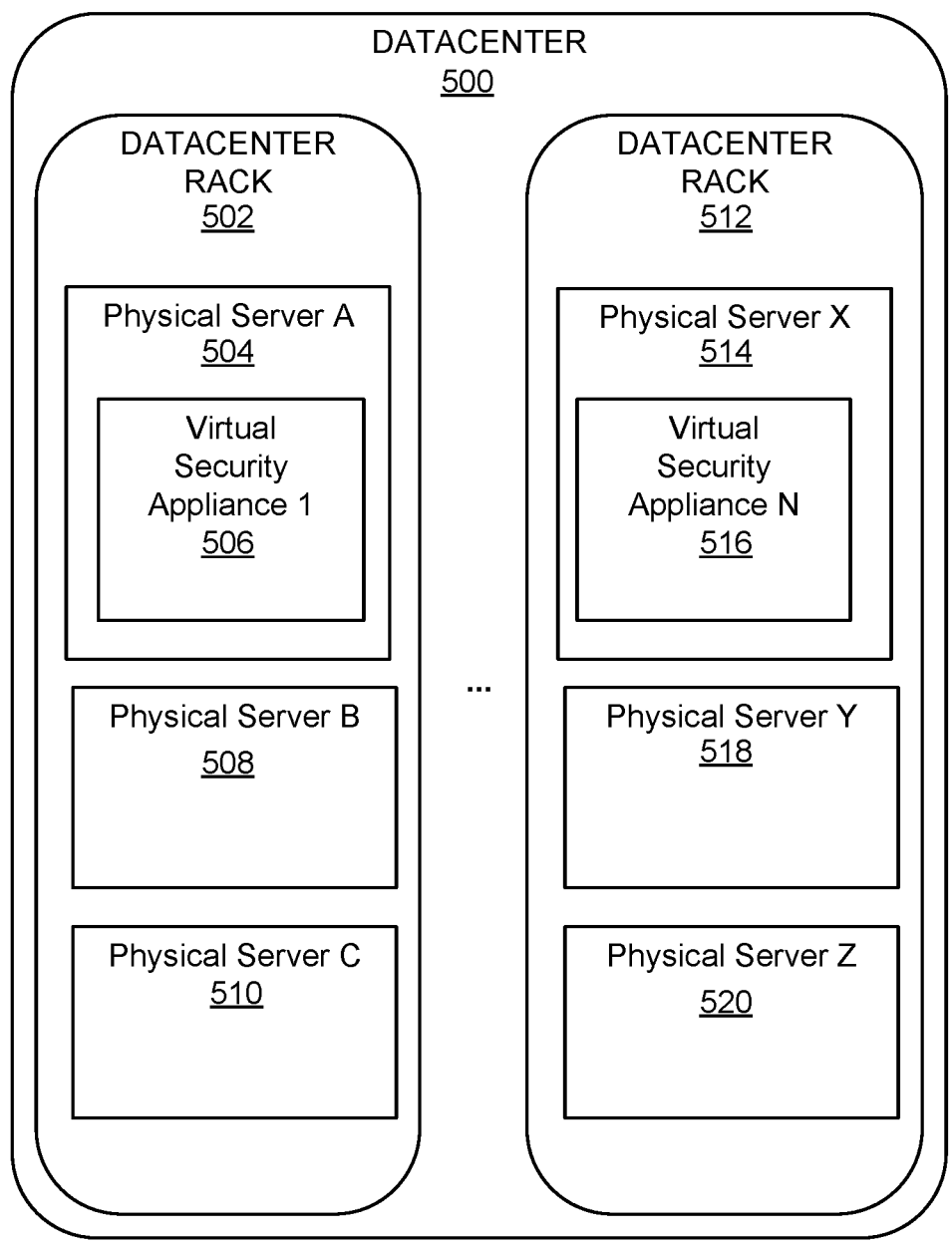
FIG. 5 illustrates an embodiment of a datacenter including datacenter racks to host a physical server or a virtual security appliance.

FIG. 5 is an embodiment of a datacenter including datacenter racks to host a physical server or a virtual security appliance. As shown, datacenter 500 includes multiple datacenter racks, 502 and 512, which include physical servers 504, 508, 510, 514, 518, and 520. The physical servers 504 and 512 are shown to include virtual security appliances 506 and 516. A deployed security appliance may be a physical appliance, or a virtual appliance deployed upon a server within the datacenter. In either case, the hierarchy of security services executing within the appliance scale within the confines of the appliance itself. As a consequence, scaling a security service to meet increased demand (scale out) means deploying one or more additional security appliances (either an additional physical server dedicated to security, or a physical server including a virtual security appliance). These plurality of appliances are load balanced at the interface level (routing or physical interfaces) meaning that traffic is split among appliances based on layer 2-4 properties such as IP address ranges. As each appliance has a configuration interface, all configurations of this plurality of appliances are synchronized and kept consistent.

Scaling security services by adding additional appliances may cause problems for datacenter administration. For example, replicating an entire appliance, rather than just the service or hierarchy level requiring additional performance, wastes datacenter resources.

Figure 6:
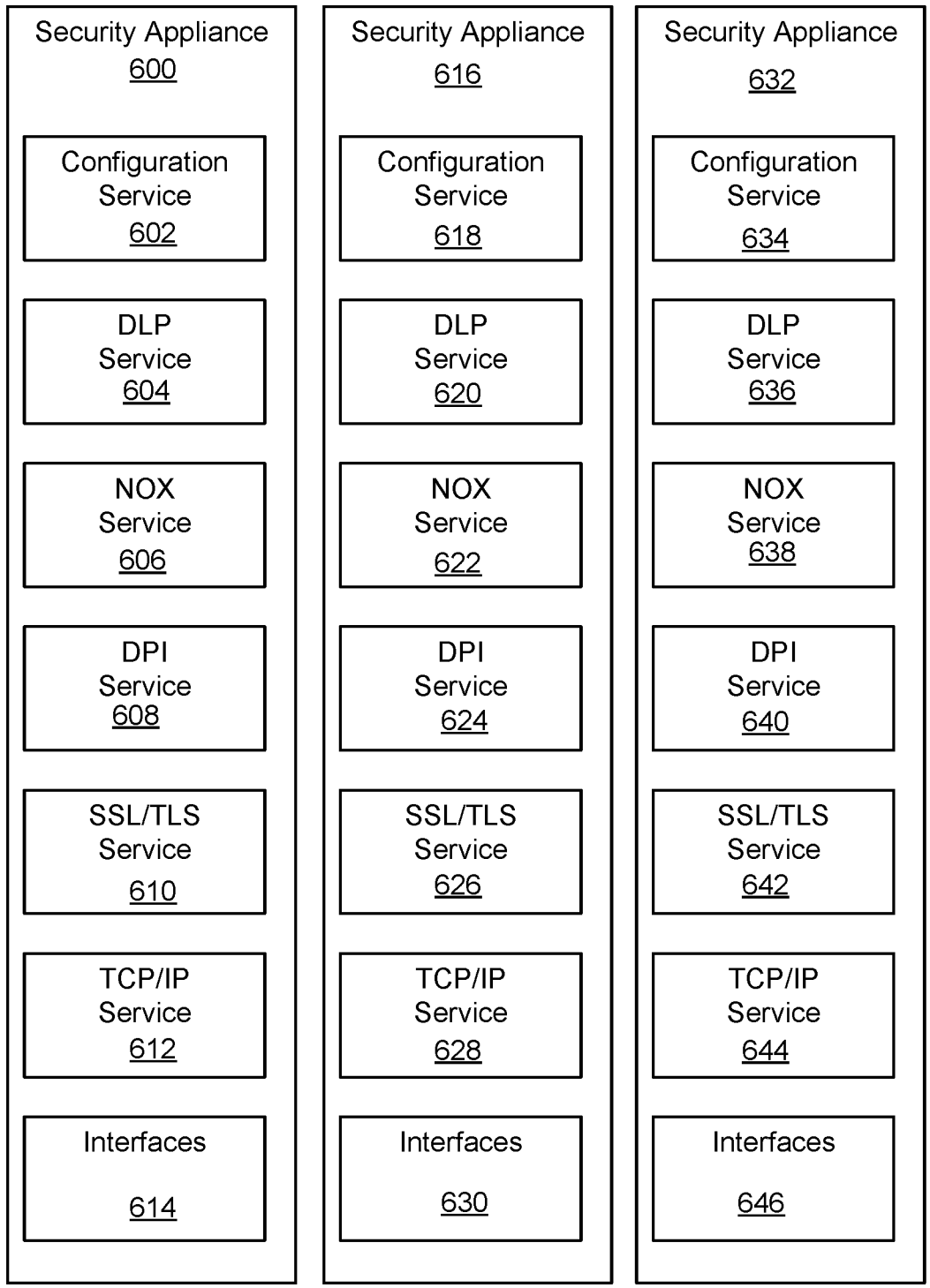
FIG. 6 illustrates an embodiment of datacenter scaling out to meet a three-time scale out requirement.

FIG. 6 illustrates an embodiment of a datacenter scaling out to meet a three-time scale out requirement. As shown security appliance 600 has been provisioned to include a configuration service 602, a DLP service 604, a NOX service 606, a DPI service 608, a SSL/TLS service 610, a TCP/IP service 612, and interfaces 614. As illustrated, the 3× scale-out requirement is met by provisioning an additional security appliance 616, which includes configuration service 618, DLP service 620, NOX service 622, DPI service 624, SSL/TLS service 626, TCP/IP service 628, and interfaces 630, and a second additional security appliance 632, which includes configuration service 634, DLP service 636, NOX service 638, DPI service 640, SSL/TLS service 642, TCP/IP service 644, and interfaces 646.

Unfortunately, the scale-out illustrated in FIG. 6 may have a number of drawbacks. For example, resources may be wasted, as a number of microservices, 620, 622, 626, 628, 636, 638, 642, and 644 are provisioned but not used. Therefore, the resources of two extra DLP, NOX, SSL/TLS, and TCP/IP services are configured to be used, but are wasted. Also, the three configuration services, 602, 618, and 634, must synchronize and share state information. Furthermore, load balancing in the system scaled out according to FIG. 6 is performed at an interface level. This is undesirable as it is often not possible to partition the traffic streams at the interface level to result in balanced loads for the security services. As an example, dividing traffic streams into thirds may still result in a particular third requiring significantly more processing by a specific layer of security service. The amount of processing each portions of the traffic requires may also change continuously.

Inserting and removing physical appliances is generally an involved process making this form of scaling ill-suited to rapidly changing demands or changing network traffic profiles. Maintaining consistency of all appliance configurations imposes additional burdens on the datacenter administrator. Determining how to configure the load balancing for the plurality of appliances may not be possible as the demands of different traffic streams on the hierarchy of security services may not be readily discernable. For example, it is not possible to predict which encrypted traffic streams require more DLP services without first decrypting the streams whereas the load balancing decision is made before decryption take places.

Figure 7:
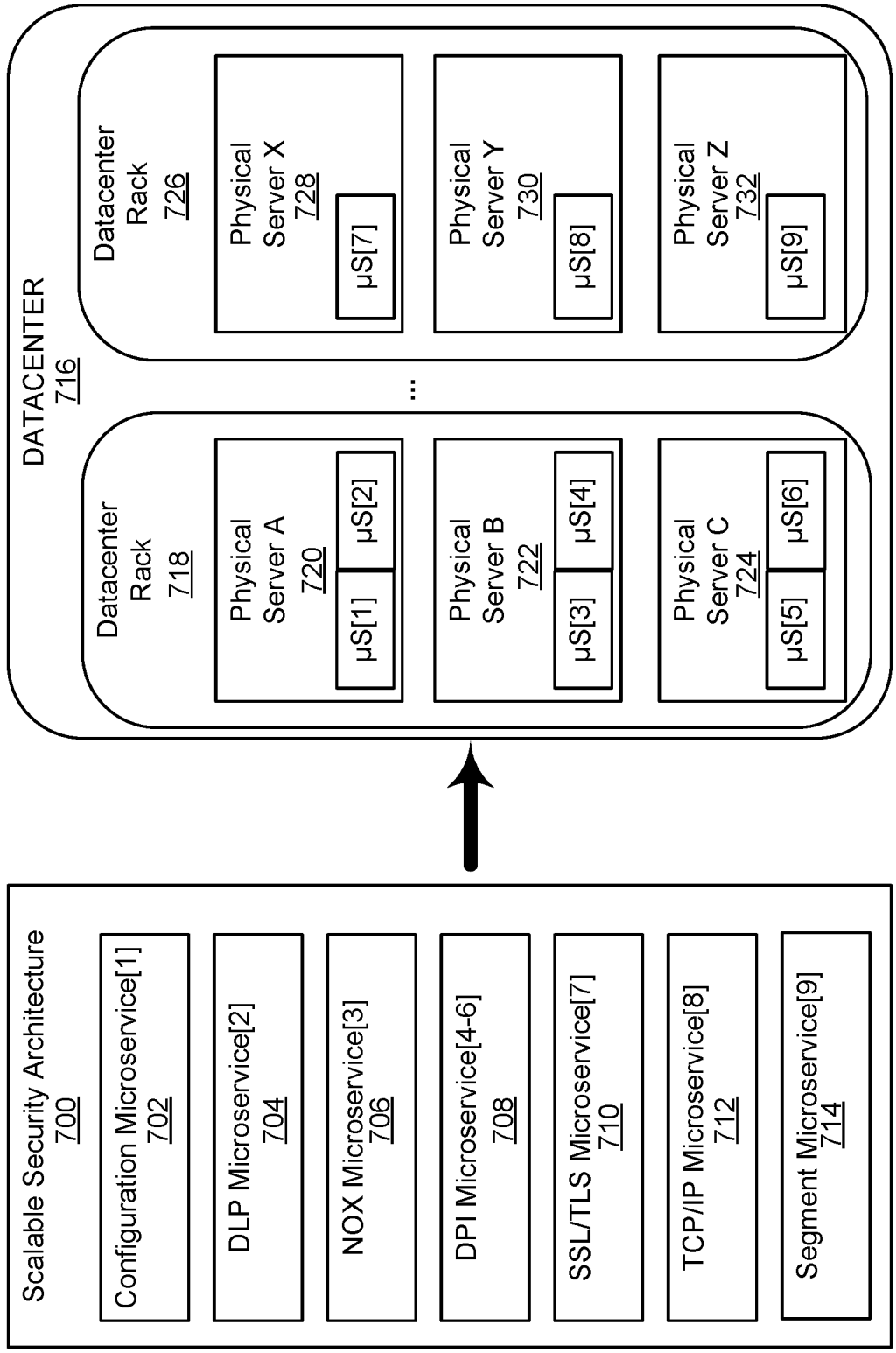
FIG. 7 illustrates meeting a three-time scale out requirement according to an embodiment; of the present invention.

FIG. 7 illustrates meeting a three-time scale out requirement, according to an embodiment, using microservices. In this example, only a single microservice (DPI) requires additional resources. As shown, by utilizing a scalable microservice architecture 700, including DLP microservice 704, NOX microservice 706, DPI microservice 708, SSL/TLS microservice 710, TCP/IP microservice 712, and Segment microservice 714, each layer of the security service hierarchy is scaled and configured independently to load balance the supply of processed data to the next hierarchy level. As shown, configuration microservice 702 and DLP microservice 704 have been assigned to be performed as microservices 1 and 2, respectively, on physical server A 720. NOX microservice 706 has been assigned to be performed as microservice 3 on physical server B 722. DPI microservices 708 have been scaled out 3×, and in this instance assigned to be performed as microservices 4-to 6 on Physical Server B 722 and physical server C 724. The remaining microservices of scalable security architecture are shown as being implemented in datacenter 716 by datacenter racks 718 and 726, which includes physical servers X, Y, and Z, 728, 730, and 732. A configuration microservice 702 creates a configuration backplane and a data plane deployed as a software component on each physical server that is to receive security services. This creating process takes the form of configuring routing rules, reserving network address s6e (such as a subnet) and configuring virtual environments to utilize portions of the reserved address s6e as gateways for network communication in and out of the servers to be secured. Both the backplane and data plane may thus be considered virtual networks managed by the security system. All security microservices may then utilize these networks to transmit packets, content, state and other information among themselves. The properties of the backplane and data plane are configured to reject packet traffic from outside the security system and route information between microservices regardless of the physical server and virtual environment configuration.

Figure 8:
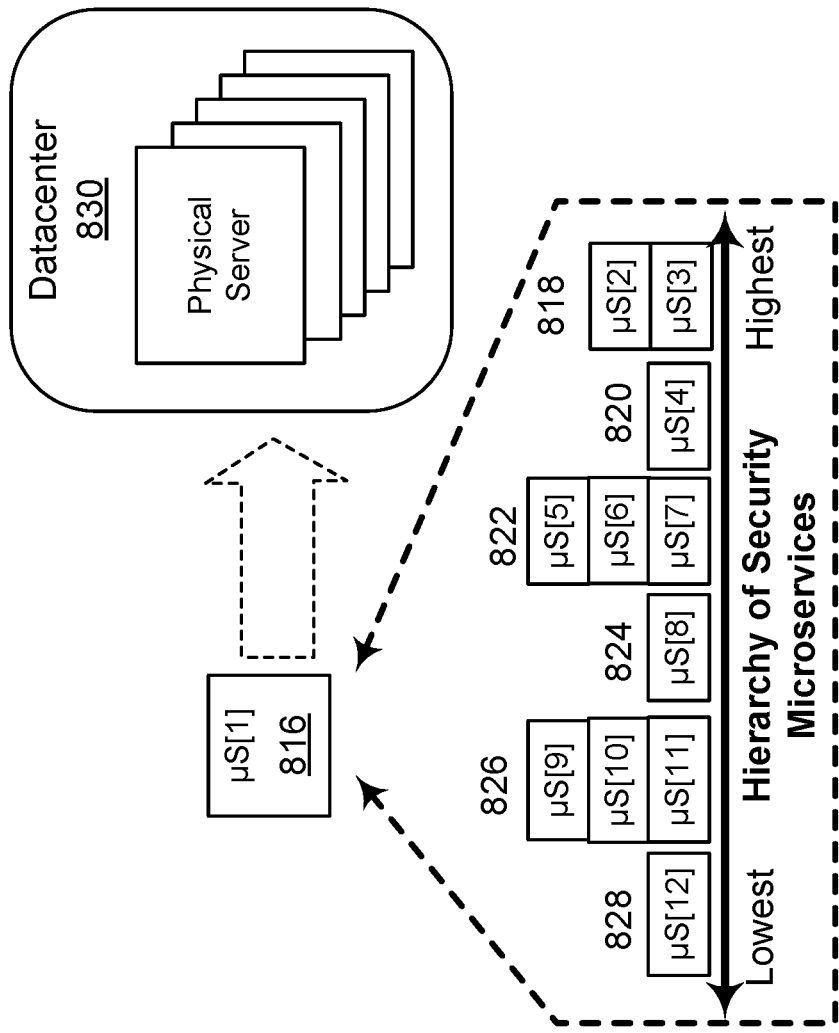
FIG. 8 illustrates meeting an arbitrary scale-out requirement according to an embodiment.

FIG. 8 illustrates meeting an arbitrary scale-out requirement according to an embodiment. As shown, scalable security architecture 800 includes configuration microservice 802, DLP microservice 804 (needing a 2× scale-out), NOX microservice 806, DPI microservice 808 (needing a 3× scale-out), SSL/TLS microservice 810, TCP/IP microservice 812 (needing a 3× scale-out), and segment microservice 814. As shown, configuration microservice 816, provisions (818, 820, 822, 824, 826, and 828) the 11 microservices from a lowest hierarchy to a highest hierarchy, and configures them to communicate with each other via backplane.

FIG. 9 illustrates meeting an arbitrary scale-out requirement by scaling out a microservice according to an embodiment. As shown, scalable security architecture 900 includes configuration microservice 902, DLP microservice 904 (needing a 2× scale-out), NOX microservice 906, DPI microservice 908 (needing a 3× scale-out), SSL/TLS microservice 910, TCP/IP microservice 912 (needing a 3× scale-out), and segment microservice 914. As shown, configuration microservice 916 provisions (918, 920, 922, 924, 926, and 928) the 11 microservices from a lowest hierarchy to a highest hierarchy, and configures them to connect with data plane 930.

Scaling the performance of different security services is ordinarily unbalanced, i.e. the performance requirements of different levels of the security hierarchy are most often different and an increase in the requirement of one level is rarely accompanied by an equivalent performance increase requirement.

Figure 10:
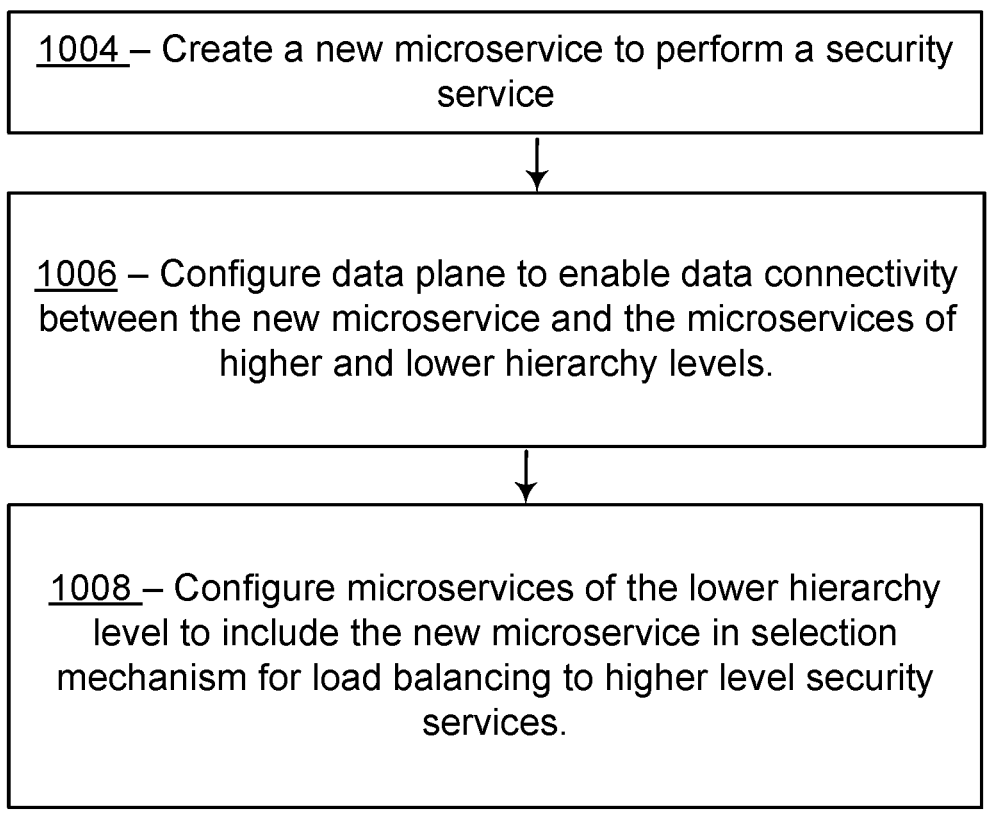
FIG. 10 is a flow diagram illustrating a method of scaling out a hierarchy of microservices in a security system.

FIG. 10 is a flow diagram illustrating a method of scaling out microservices within a hierarchy of microservices in a security system. Typically, embodiments of this method are performed by the execution of a configuration microservice on a hardware processor. However, other microservices or actors may perform one or more aspects of embodiments of this method. As illustrated, a configuration microservice, upon detecting that the existing microservices of a particular hierarchy are consuming too many resources or are otherwise limiting the performance of the security system, scales out a particular security service (hierarchy). The method of detection may include monitoring load and latency statistics of microservices, performance characteristics of virtual and physical servers or other available metrics and evaluating these monitored metrics against thresholds. At 1004, the configuration microservice subsequently initializes a new microservice configured to perform the security service of the particular hierarchy on a server. At 1006, the configuration microservice configures the data plane to enable data connectivity between the new microservice and the microservices of higher and lower hierarchy levels. At 1008, the configuration microservice configures the microservices of the lower hierarchy level to include the new microservice in their selection mechanism for load balancing to their higher-level security service.

Figure 11:
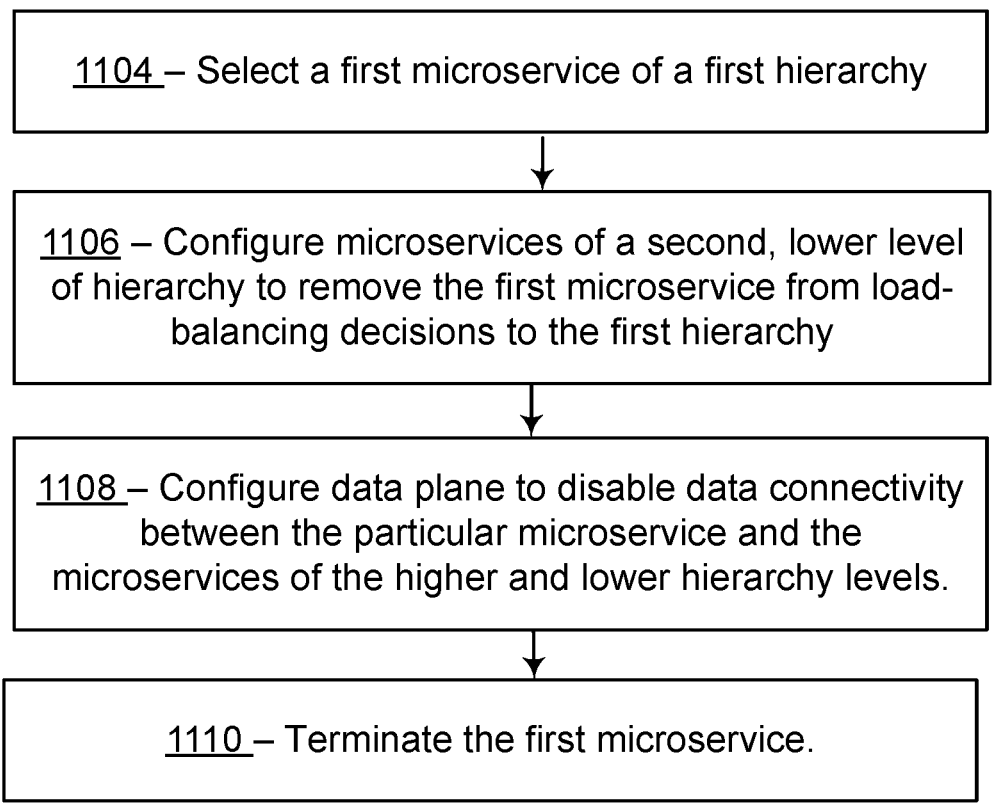
FIG. 11 is a flow diagram illustrating a method of scaling in a hierarchy of microservices in a security system.

FIG. 11 is a flow diagram illustrating a method of scaling in microservices within a hierarchy of microservices in a security system. Typically, embodiments of this method are performed by the execution of a configuration microservice on a hardware processor. However, other microservices or actors may perform one or more aspects of embodiments of this method. At 1104, the configuration microservice selects a first, particular security service (hierarchy) of a first hierarchy to scale in. In an embodiment, the configuration microservice selects the particular security service upon detecting that the existing microservices of a particular hierarchy are not being fully utilized or are otherwise wasting resources within the security system. At 1106, the configuration microservice configures the microservices of a second, lower hierarchy level (relative to the particular security service) to remove the particular microservice from their selection mechanism for load balancing to their higher-level security service. At 1108, the configuration microservice configures the data plane to disable (or remove) data connectivity between the particular microservice and the microservices of higher and lower hierarchy levels. At 1110, the configuration microservice terminates (or ends) the particular microservice.

Figure 12:
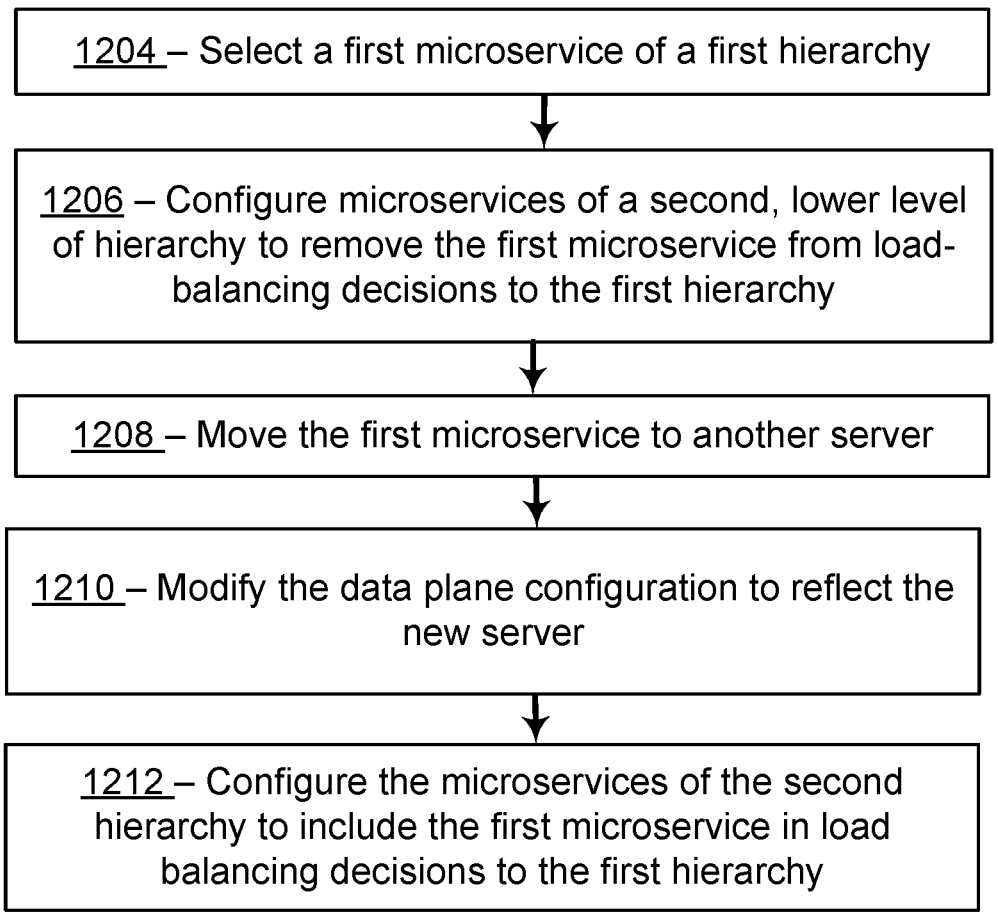
FIG. 12 is a flow diagram illustrating a method of optimizing a hierarchy of microservices in a security system.

FIG. 12 is a flow diagram illustrating a method of optimizing a hierarchy of microservices in a security system. Typically, embodiments of this method are performed via the execution of a configuration microservice on a hardware processor. However, other microservices or actors may perform one or more aspects of embodiments of this method. At 1204, a first microservice of a first hierarchy is selected. In an embodiment, to increase the resource utilization efficiency of a particular security microservice, configuration detects that the server on which the first selected microservice of the first hierarchy is running is no longer suited to support the microservice (due to memory, IO, disk or other utilization metrics). At 1206, the configuration microservice configures the microservice of the lower hierarchy level (relative to the particular security service) to disable the particular microservice from their selection mechanism for load balancing to their higher-level security service. At 1208, the configuration microservice moves the microservice to another server. At 1210, the configuration microservice modifies the data plane configuration to reflect the new server. At 1212, the configuration microservice configures the microservices of the lower hierarchy level to include the moved microservice in their selection mechanism for load balancing to their higher-level security service. The process ends at 1214.

Network Security System

Figure 1:
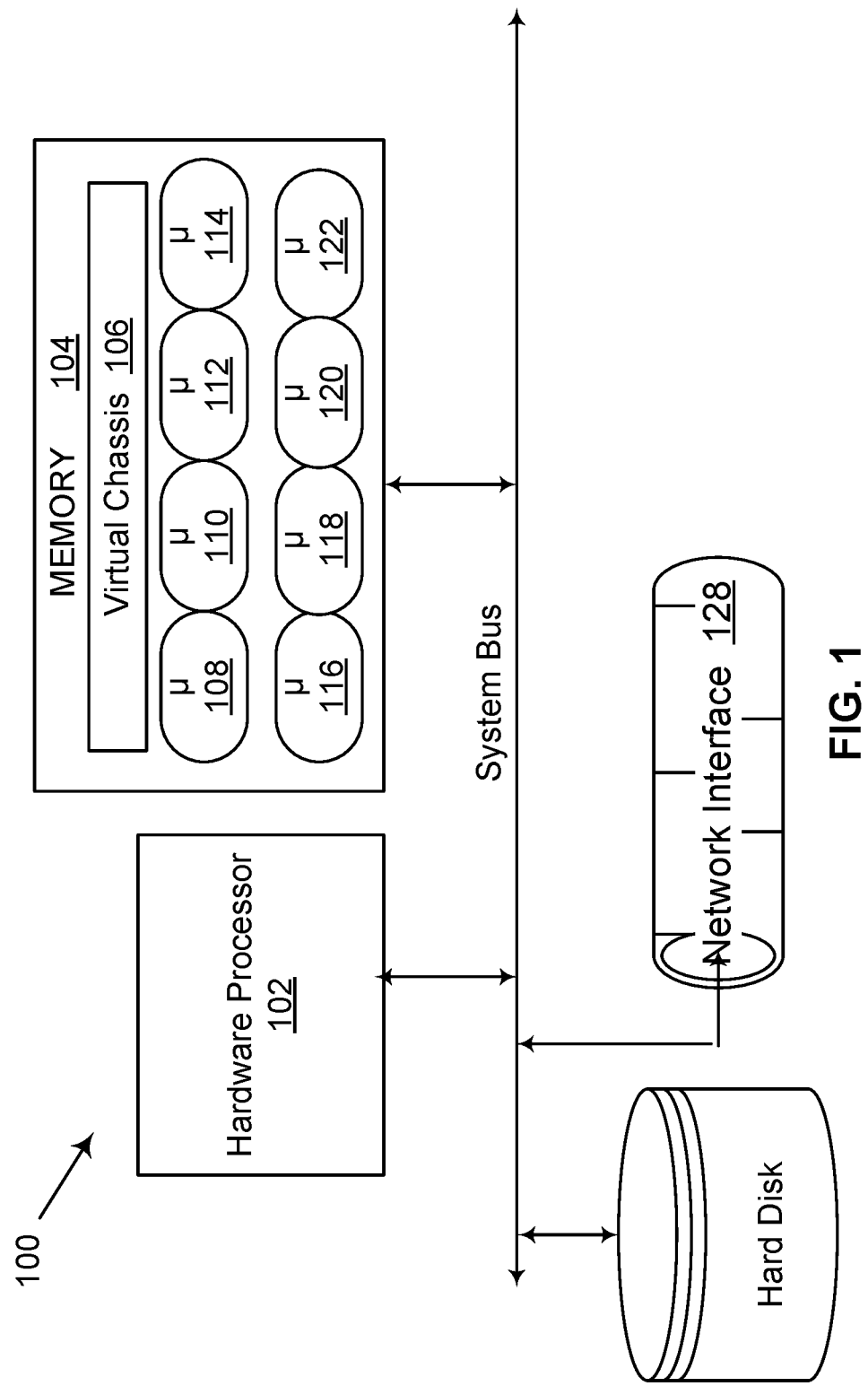
FIG. 1 is a block diagram illustrating computer hardware for loading network security system microservices from a memory and executing them by a processor.

FIG. 1 is a block diagram illustrating an embodiment of components of a scalable microservice architecture using microservices. Network security system microservices are stored in memory (e.g., volatile memory such as Random Access Memory (RAM) and/or non-volatile memory such as disk) and executed by one or more hardware processors or processor cores. Network security system microservices, consisting of executable instructions to perform a specific security service, are deployed based on configuration across available physical servers. Typically, each microservice receives configuration and tasks via a backplane of a virtual chassis 106 and returns status, statistics and other information to the backplane. A common property of a microservice is the separation and protection of memory from other microservices. In this manner, an individual microservice may be moved to another physical server or terminate abnormally without impacting other microservices.

The data processed by the security system is transferred from a microservice to another (higher hierarchy) microservice using a data plane. In some embodiments, during such a transfer, the lower microservice makes a decision (based on configuration, current statistics and other information) as to which higher-hierarchy microservice to utilize. Such a decision may constitute a load-balancing decision to assure that the higher-hierarchy microservices are efficiently utilized. In other embodiments, the decision of which microservice to utilize is made by a more central entity.

As illustrated, network security system utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices store in memory 104 (e.g., volatile memory such as Random Access Memory (RAM) and/or non-volatile memory such as disk). A networking interface (e.g., fabric or interconnect that is wired or wireless) 128 provides a means for communicating with a data center. Network security system may inspect traffic, detect threats, and otherwise protects a data center, as further described below, using microservices.

Embodiments of a network security system providing the above ca4ilities are now discussed in more detail. Network security system adds security to, or enhances the security of, a datacenter. In an embodiment, network security system is delivered in the form of a seed software application (e.g., downloaded). The seed software application instantiates microservices of the network security system on a host in the datacenter. As used herein a microservice container refers to where the microservice runs, most prominently a virtual machine. Once deployed, network security system utilizes available processing power (as detailed above) 102, memory 104, and network connection 128. In many scenarios, security may be added/configured using existing hardware and/or without having to purchase specific rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

Once initiated, as also further described below, network security system, in some embodiments, will utilize the physical network interface 128 to explore the datacenter to discover what network segments exist, the security requirements of various network segments, and what hosts and hardware resources are available, and additional configuration information as needed. In an embodiment, the datacenter itself includes several machines with hypervisors, or physical hardware, and the network security system 100 offers microservices to communicate with and protect one or more of those internal virtual machines or physical hardware. After performing datacenter discovery, network security system will, in some embodiments, then offer or suggest available security tools to be selected either through a user interface, or by connections with existing enterprise management software. In one embodiment, once configured, network security system is deployed "in-line," receiving substantially all of the packets headed for the datacenter, allowing network security system to intercept and block suspicious traffic before it arrives at the datacenter. With an understanding of the datacenter, network security system 100 deploys microservices to inspect traffic throughout the datacenter, not just at the ingress. In some embodiments, network security system is deployed in a "copy only" configuration, in which it monitors traffic, detects threats, and generates alerts, but does not intercept traffic before it arrives at the datacenter.

Referring again to FIG. 1, though not shown, hardware processor 102 in one embodiment includes one or more levels of cache memory. As shown, memory 104 has stored therein microservices 108, 110, 112, 114, 116, 118, 120, and 122, as well as virtual chassis 106, which is itself a microservice. In an embodiment, the microservices are small in size, consisting of a relatively small number of instructions. In an embodiment, the microservices are independent of each other. As illustrated, microservices 108-122 are microservices that are loaded from memory and executed by the hardware processor 102. Those microservices include datapath security microservices, for example TCP/IP, SSL, DPI, or DPL inspection microservices, as described further below with respect to FIGS. 14, 17, and 19. The microservices may also include management microservices, for example a chassis controller to manage the microservices, a configuration microservice, an infrastructure discovery microservice, a database microservice to store data, and a policy update microservice to receive policy updates from an external security cloud, and a compiler to receive policy data from various sources and to produce binary policy outputs to be used by the microservices, to name a few examples that are described further below with respect to FIGS. 14, 17, and 19.

Network security system receives traffic via interface 128 to/from s datacenter. In one embodiment, network security system is placed in-line to inspect traffic, and potentially intercept a threat before it arrives at, or leaves, the datacenter. In alternate embodiments, network security system monitors the traffic heading into, or out of, the datacenter, in which case the network security system detects threats and generates alerts, but does not block the data. Hardware processor 102 then executes various data security microservices on the data. For example, as will be described further below with respect to FIGS. 14, 17, and 19, typically traffic first passes into and through a segment microservice, then a TCP/IP inspection microservice, then an SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Datapath microservices as used herein refer to various microservices that inspect and analyze network traffic, such as TCP, TLS, DPI, NOX, or DLP. TCP microservice, for example, refers to a packet handling microservice able to process any layer 4-6 network packet and includes part of Firewalling. TLS microservice, for example, refers to Transport Layer Security microservice, which decrypts/re-encrypts connections. DPI microservice, for example, refers to Deep Packet Inspection microservice and handles layer 7 inspection. NOX microservice, for example, refers to Network Object Extractor microservice, and works in conjunction with DPI to assemble objects from individual packets and deliver them to other services. DLP microservice, for example, refers to Data Loss Prevention microservice, which detects and prevents data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices will, in one embodiment, be reported to a chassis controller microservice, which takes remedial action.

In an embodiment, microservices 108-122 are loaded from the Internet, via interface 128. For instance, in an embodiment, the microservices are downloaded from a web site or online store site. In some embodiments, microservices 108-122 are loaded into memory 104. In various embodiments, the microservices are loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium in one instance are stored into memory 104. The embodiments are not limited in this context. In further embodiments, a digital medium is a data source that constitutes a combination of hardware elements such as a processor and memory.

In most embodiments, network security system runs on a datacenter computer. In alternate embodiments, however, network security system is installed and runs on any one of a wide variety of alternate computing platforms, ranging from low-cost to high-cost, and from low-power to high power. In some embodiments, network security system is installed on and runs on a low-cost, commodity server computer, or, in some embodiments, on a low-cost rack-mounted server. As illustrated, hardware processor 102 is a single core processor. In alternate embodiments, hardware processor 102 is a multi-core processor. In alternate embodiments, hardware processor 102 is a massively parallel processor.

In some embodiments, virtual chassis 106 and microservices 108-122 may be hosted on any of a wide variety of hardware platforms used in the datacenter to be protected. Table 1, below, lists and describes a number of exemplary datacenter environments, any one of which hosts virtual chassis 106 and microservices 108-122:

TABLE 1

| Environments for Hosting Virtual Chassis 106 | |
|---|---|
| Environment | Description |
| Bare Metal | This environment is associated with the North/South Use Case. Network security system microservices will be hosted on ESX hypervisors and physical hosts upon which the FE microservices reside will be connected to the physical network where required. There will be no orchestration/integration touch point for this environment. |
| ESX | This environment is associated with the East/West Use Case. Network security system microservices will be hosted on ESX hypervisors. The orchestration/integration touch point will be vCenter. |
| NSX | This environment is associated with the East/West Use Case. Network security system microservices will be hosted on ESX hypervisors. The orchestration/integration touch point will be NSX Controller. |
| OpenStack | This environment is associated with the East/West Use Case. Network security system microservices will be hosted on KVM hypervisors. The orchestration/integration touch point remains to be determined. Because of the fragmented nature of the OpenStack market, the Network security system) will be developed and tested to a single choice of version, distribution and network controller and will then be customized on a customer-by-customer basis. |

TABLE 1-continued

Environments for Hosting Virtual Chassis 106

| Environment | Description |
|---|---|
| AWS | This environment is associated with the Public Cloud Use Case. Network security system microservices will be hosted as AWS instances. The orchestration/integration touch point will be AWS Config/AWS OpsWorks. |
| Microsoft Azure | This environment is associated with the Public Cloud Use Case. Network security system) microservices will be hosted as Azure Virtual Machines. The orchestration/integration touch point will be Azure Automation and Runbooks. |

In some examples, network security system scales out using available resources to accommodate higher traffic or load. In an exemplary embodiment CPU 102 and memory 104 is scaled out or in dynamically as needed: additional CPUs and memory are added if scaling out, and some CPUs and/or memory are powered down if scaling in. This scaling out is performed to allocate the additional CPUs and memory to those portions of the security hierarchy for which they are needed while not allocating additional CPUs and memory to those portions of the security hierarchy that can accommodate the higher traffic utilizing their existing allocation.

Figure 13:
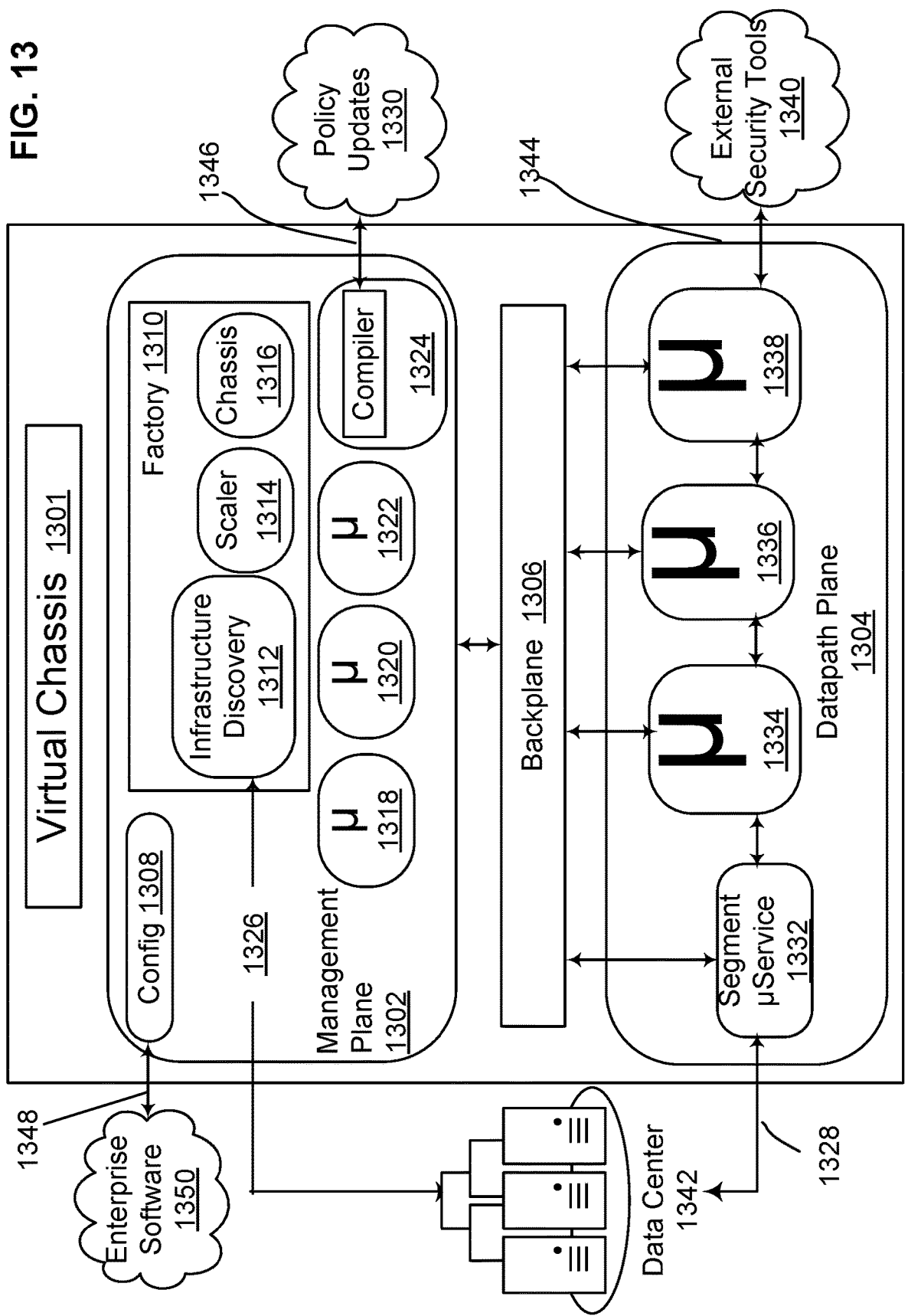
FIG. 13 is another block diagram illustrating a network security system according to one embodiment.

FIG. 13 is a block diagram illustrating a portion of a network security system according to an embodiment. As illustrated, network security system includes a virtual chassis 1301, management plane 1302, datapath data plane 1304, and backplane 1306 (not shown is the underlying hardware to store and execute this software). FIG. 13 illustrates a logical system architecture of network security system, each of the components of which is implemented by a network security system similar to the network security system of FIG. 1.

Microservices-Based Architecture

A microservices-based architecture allows for implementing components and network security tools (e.g., IP handling, TCP handling, SSL decryption, deep packet inspection) as separate microservices. By decoupling individual components, each of them is ca4le of scaling out, or in, to meet its performance requirements. Also, in an embodiment, these components are located independently of each other, even at separate geographic locations.

According to an embodiment, the microservices in virtual chassis 1301 communicate by exchanging HTTP requests using similar HTTP methods—GET, POST, PUT, DELETE, etc. In some embodiments, microservices in virtual chassis 1301 communicate using backplane microservice 1306: messages are published to backplane 1306 by a source microservice, and consumed from backplane 1306 by a destination microservice. In some embodiments, backplane 1306 supports communications among microservices in virtual chassis 1301, and communications between microservices of the network security system and enterprise software 1350, uses REST architecture. Communications with RESTful software, which is software that is compliant with REST, in some embodiments exchange structured data according to structures, like HTTP, URI, JSON, and XML, to name a few. RESTful architectures allow for flexibility in development, debugging and operation through the use of the Universal Resource Indicator (URI) as a multivariable field with hierarchy indicating variable values.

As illustrated, the network security system comprises virtual chassis 1301, management plane 1302, backplane 1306, and datapath plane 1304, each of which is a microservice implemented as a virtual machine or container and deployed on computing hardware. According to an embodiment, the host machine is equipped with a hypervisor, which is a piece of computer software, firmware or hardware that initiates and destroys virtual machines. In some embodiments, the host machine provides a micro-kernel along with micro-kernel instructions.

Management plane 1302 comprises microservices 1308, 1310, 1312, 1314, 1316, 1318, 1320, 1322, and 1324, each implemented as a virtual machine or container deployed on a computer system.

As illustrated in FIG. 13, management plane 1302 utilizes a factory 1310, which in an embodiment includes infrastructure discovery microservice 1312, scaler microservice 1314, and chassis controller microservice 1316, which in some embodiments refers to a combination of microservices, policy microservice and resource groups microservice, that scales in or out elastically. As used herein, a policy defines how to scale a chassis, be it a lazy scaling or an aggressive scaling, as described below. In some embodiments, chassis controller microservice 1316 produces new microservices on demand and scales them out or in according to load, including attestation, chassis, registry, scaling and infrastructure discovery microservices. In some embodiments, factory 1310 comprises a microservices virtualization environment defined according to a factory model. On a structural level, the factory according to an embodiment includes servers and computing devices. In some embodiments, the factory is disposed in one location. In other embodiments, the factory is distributed across various locations. In yet other embodiments, the factory virtualizes microservices from third party infrastructure suppliers. On a logical level, a factory is a virtualized platform consisting of one or more virtual CPUs, virtual memory, and virtual storage. The factory allows the microservices to be commoditized, allowing a large number and wide variety of microservices to be provided and to operate interchangeably with other microservices, including microservices from third party infrastructure suppliers.

Infrastructure discovery microservice 1312 in one embodiment interfaces with and explores a datacenter 1342 that is to be protected. As referenced in some embodiments, infrastructure refers to resources provided by an entity, such as a customer, in the form of compute, storage and networking resources. In some embodiments, an infrastructure link connects factory 1310 and the infrastructure for bidirectional communication. Infrastructure discovery microservice 1312 in such embodiment explores datacenter 1342 via interface 1326 to determine what network segments exist, the security requirements of various network segments, what hosts and hardware resources are available, and/or additional configuration information as needed.

Scaler 1314 in one embodiment is a microservice that receives load statistics from at least one of the microservices, each of which monitors its own load statistics and reports them to scaler 1314. Statistics monitored by individual microservices include, for example a number of packets handled, a number of requests handled, a queue depth of packets and/or requests to handle, and its processor and memory utilization. Scaler 1314 analyzes the microservices' loading information and decides whether to ask the chassis controller 1316 to scale out or scale in certain microservices. In one embodiment, scaler 1314 compares load statistics received from a microservice to a scale-out-threshold to determine whether to suggest that the chassis controller 1316 spin up an additional microservice. In some embodiments, scaler 1314 compares load statistics received from a microservice to a spin-in-threshold to determine whether to suggest that the chassis controller 1316 shut down an instance of the microservice.

Chassis controller 1316 in an embodiment instantiates and deploys all of the microservices of network security system 1300. In some embodiments, for example during a reboot, power-on, or after a power failure, chassis controller 1316 is among the first microservices that is spun up, and instantiates and deploys the remaining microservices. In some embodiments, when the network security system 1300 is being rebooted or otherwise recovering from a catastrophic failure, even if chassis controller 1316 is not the first microservice to spin up, whichever microservice is first to spin up checks whether chassis controller 1316 is alive, and if not, triggers it to be spun up. Checking whether chassis controller 1316 is alive is accomplished in one embodiment by pinging a predetermined address. In alternate embodiments, checking whether chassis controller 1316 is alive comprises checking a status register that maintains status for the chassis controller 1316, and, potentially other microservices. In alternate embodiments, chassis controller 1316 broadcasts its status to microservices in virtual chassis 1300, letting them know it is alive.

Configuration microservice 1308 in one embodiment receives configuration information from a user through a user interface. In alternate embodiments, configuration microservice 1308 communicates with and receives configuration information from enterprise software 1350 via interface 1348. Config microservice 1308 in an embodiment communicates with enterprise software 1350 using the REST architecture, described above. In some embodiments, configuration microservice 1308 uses the datacenter configuration (e.g., learned from infrastructure discovery microservice 1312), and suggests security policies and tools for the user to select.

Compiler microservice 1324 in one embodiment receives security policy updates via interface 1346 from policy updates cloud 1330, which in an embodiment comprises a group of network security professionals constantly identifying potential security threats and devising policies for responding to them. The newly devised policies are received by compiler microservice 1324, converted, if necessary, to a language understood by various microservices, and conveyed to the microservices.

Various additional management microservices 1318, 1320, and 1322 are available to be deployed in a network security system. As illustrated, management plane 1304 comprises nine microservices, but the number of microservices is not so limited; the number could be higher or lower, without limitation.

Datapath plane 1304 comprises microservices implementing a segment microservice 1332 (sometimes referred to simply as "front end" or "FE") and data security microservices 1334, 1336, and 1338. As illustrated, datapath plane 1304 communicates via bidirectional interface 1344, with external security tools 1340. Various embodiments of data security microservices are available to be deployed, and some are described further below. As illustrated, datapath plane 1304 comprises four microservices, but the number of microservices is not so limited. In some embodiments, datapath plane 1304 contains more than four microservices, and in another embodiment, datapath plane 1304 contains fewer than four microservices.

In some embodiments, segment microservice 1332 exchanges data with datacenter 1342. Segment microservice 1332 operates bidirectionally via interface 1328 to forward packets received from datacenter 1342 to appropriate datapath microservices, and to forward return packets received from datapath microservices to datacenter 1342. In an embodiment, the connections providing traffic received by segment microservice 1332 comply with the TCP/IP protocol, which characterizes the connection with a 5-tuple, as is understood by those of skill. Such a 5-tuple generally consists of a source IP address and TCP port, a destination IP address and TCP port and an interface. The interface 1328 may be specified by name, Ethernet MAC address or other means. In an embodiment, segment microservice 1332 adds a sixth tuple to the packets before forwarding them to the datapath microservices. In some embodiments, the sixth tuple carries routing information about which datapath microservices should receive the packet. The sixth tuple in an embodiment also carries an Identifier to uniquely identify a particular connection. If a datapath microservice detects a threat or malware, it uses the identifier and 5-tuple information to ask the segment microservice to discontinue that Ethernet connection.

Backplane 1306 comprises a communications microservice that enables communications among datapath microservices 1332 to 1338 of datapath plane 1304, communications between management microservices of management plane 1302 and datapath plane 1304, and indirect communications between management microservices 1308 to 1324. In one embodiment, management microservices 1308 to 1324 do not communicate directly with each other, so as to avoid a zombie connection when one or the other of the microservices should fail. Instead, in one embodiment, management microservices rely on backplane 1306 as a middle-man to convey messages between them.

In some embodiments, microservices 1301 to 1338 are individual virtual machines or containers, each running on commodity server hardware. By breaking the design into its constituent microservices, the network security system 1300 has the ability to scale out any of these functions, as required. This scale-out ca4ility in some embodiments is able to employ additional available hardware.

As illustrated, the microservices 1301 to 1338 that make up a network security system 1300 are collectively grouped into a single entity, identified as virtual chassis 1302. In one embodiment, microservices 1304 to 1332 are located in a single environment (data center, private cloud or public cloud). In some embodiments, virtual chassis 1302 and microservices 1304 to 1332 are housed in a single server, computer, or rack-mount system. In some embodiments, virtual chassis 1302 and microservices 1304 to 1330 are housed in multiple hardware environments. In yet further embodiments, virtual chassis 1302 and microservices 1304 to 1332 are housed in geographically distinct environments.

In operation, network security system 1300 provides network security to data center 1342. In a first embodiment, network security system 1300 is deployed in a Data Center East/West Deployment, in which it is deployed in a data center (with virtualized compute) to inspect and enforce policy on traffic where both the source and destination of the flow are located within the data center. In a second embodiment, s network security system is deployed in a Data Center North/South Deployment, in which it is deployed in a datacenter to inspect and enforce policy on traffic where either the source or destination of the flow (but not both) are located outside the data center. In a third embodiment, s network security system is deployed in a Public Cloud Deployment, in which it is deployed in a public cloud to inspect and enforce policy on traffic that is either entering or leaving a specific tenant's partition in that cloud. In yet a fourth alternate embodiment, a network security system is deployed according to a combination of one or more of these alternatives.

Further, during operation, in one embodiment, the scale-out and scale-in functionality of any of microservices 1302 to 1338 is handled independently of the other microservices, according to resource consumption policies. In particular, each of the microservices in one embodiment monitors the amount of traffic it is handling, be it in the form of a number of data packets it is handling, a number of requests it is serving, a depth of its internal queues, or other means. In one embodiment, each of the microservices forwards its load statistics to Scaler 1314, which will decide whether to instantiate new microservices or shut down old ones.

In one embodiment, chassis controller 1316 manages the microservices 1302 to 1338. In particular, in one embodiment, chassis controller 1316 receives suggestions from scalar 1314, and determines whether to scale out or scale in various microservices. In one embodiment, managing microservices 1302 to 1338 is simplified by the chassis controller 1316 being managed as a single entity, just as a physical chassis would be. In one embodiment, chassis controller 1316 is programmed with a general resource control policy to be applied to one or more microservices 1302 to 1338. So, in one embodiment, even if the appliance grows very large, or if it spans multiple environments, or even if it spans multiple geographic locations, there is a single chassis controller 1316 to provide a management interface for a network administrator to access.

In one embodiment, microservices 1302 to 1338 provide built-in redundancy because each individual instance of a microservice is backed-by additional instances of that same microservice. If a single instance were to fail, the other microservices will continue operating while a replacement is spun up. It is also possible to provision more instances of a given microservice to provide n+1 redundancy.

In one embodiment, adding a new instance of a security control microservice, a new security policy for an existing microservice, or a new type of security microservice is done without requiring new hardware to be added, or existing hardware to be altered. In particular, in such embodiment, a new instance of a security control microservice is created by instantiating another instance of an existing microservices on the computer hardware hosting the microservices of virtual chassis 1316. A new type of microservice is thus deployed by chassis controller 1316, without impacting the performance of the network security system 1300.

Figure 14:
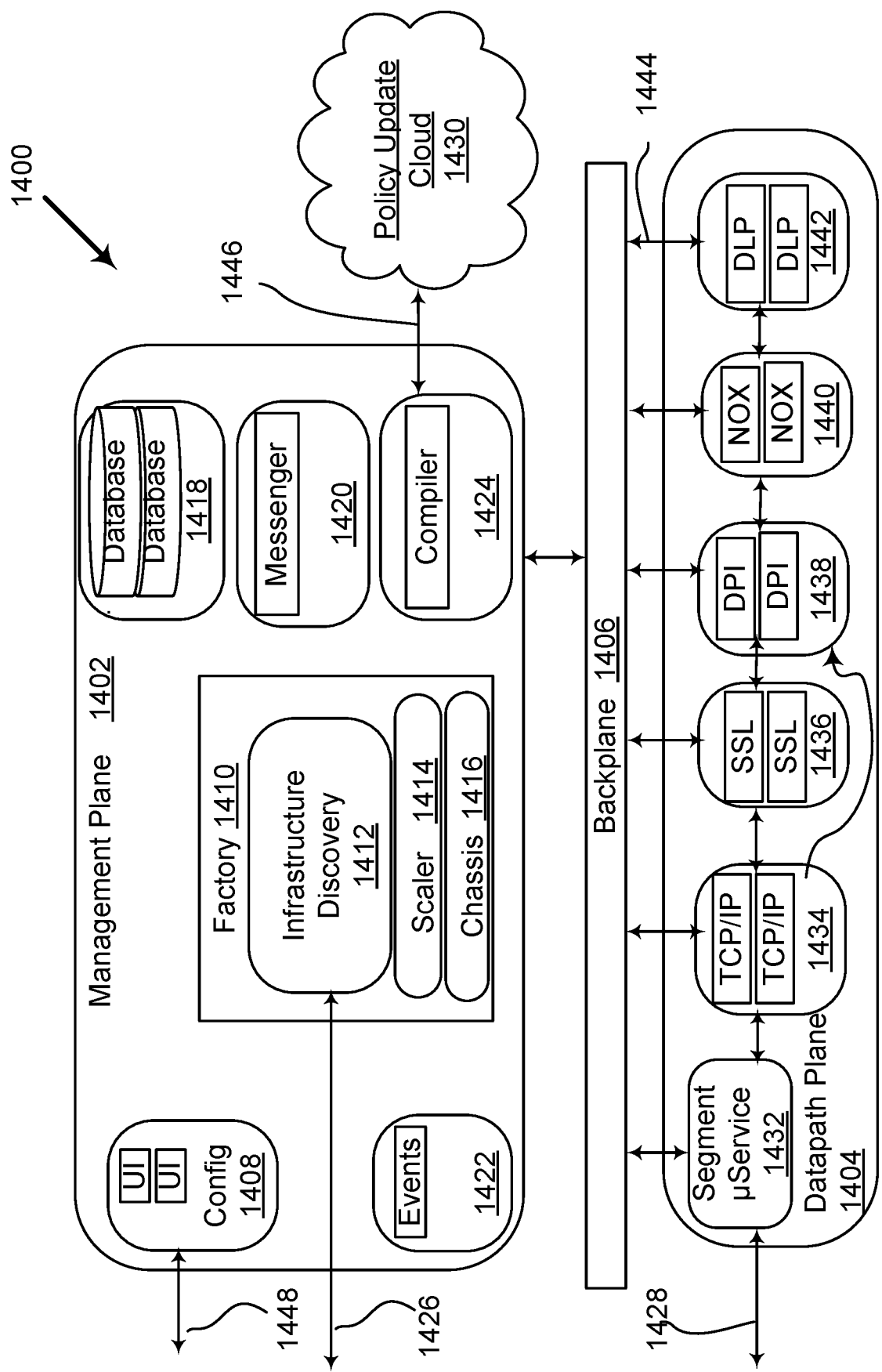
FIG. 14 is another block diagram illustrating a network security system according to an embodiment.

FIG. 14 is a block diagram illustrating a network security system according to an embodiment. As illustrated, a network security system includes management plane 1402, datapath plane 1404, and backplane 1406. FIG. 14 illustrates a logical system architecture of s network security system, each of the components of which is implemented by computing hardware.

The network security system uses a microservice-based architecture that deconstructs the network security appliance, breaking it down into a series of building blocks, each implemented as a microservice.

Management plane 1402 includes microservices 1408, 1410, 1412, 1414, 1416, 1418, 1420, 1422, and 1424, each implemented as a virtual machine or container deployed on a computer system).

As illustrated in FIG. 14, management plane 1402 utilizes a factory 1410, which comprises infrastructure discovery microservice 1412, scaler microservice 1414, and chassis controller microservice 1416. In some embodiments, management plane 1402 utilizes a microservices virtualization environment defined according to a factory model. On a structural level, the hosting environment includes servers and computing devices. In some embodiments, the hosting environment is situated in one location, while in other embodiments, the hosting environment is distributed across various locations. In other embodiments, the hosting environment includes third party infrastructure suppliers. On a logical level, the hosting environment is divided into factories. A factory is a virtualized platform consisting of one or more virtual processors, virtual memory, and virtual storage. The factory allows the microservices to be commoditized, by which a wide variety of microservices can be provided and operate interchangeably with other microservices, including from third party infrastructure suppliers.

Configuration microservice 1408, chassis controller 1416, scaler 1414, compiler 1424, and infrastructure discovery microservice 1412 in several embodiments operate similarly to their similarly-named, similarly-numbered, corresponding microservices illustrated in and discussed with respect to FIG. 13.

Figure 25:
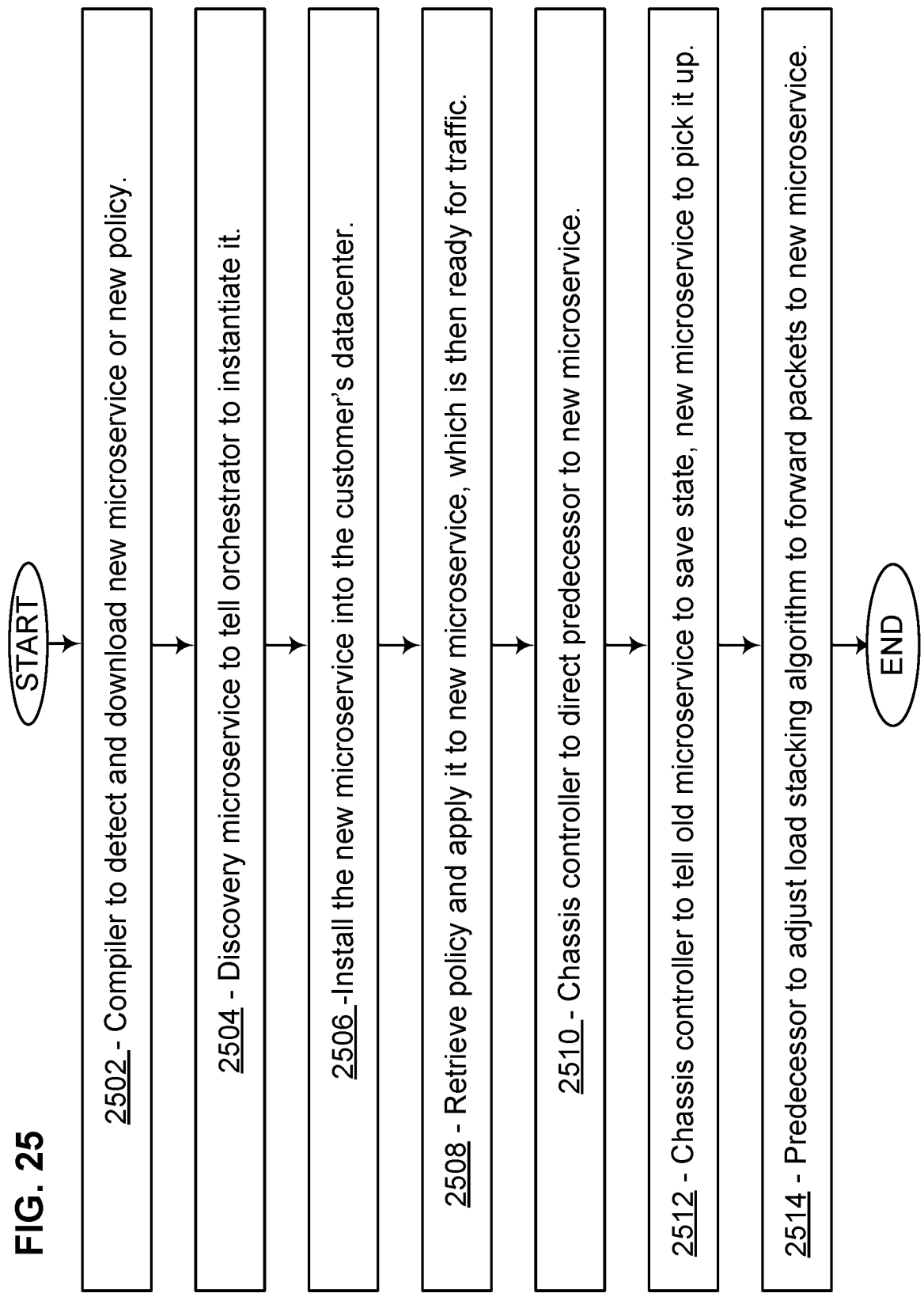
FIG. 25 is a flow diagram illustrating a process of upgrading a microservice security policy during runtime without powering down a network security system according to an embodiment.

As illustrated, segment microservice 1432 of datapath plane 1404 is coupled via interface 1428, to a datacenter. As shown, datapath plane 1404 includes microservices 1434, 1436, 1438, 1440, and 1442, which inspects different aspects of traffic and focuses on different threats, and which communicate with backplane 1406 via interfaces 1444. The particular threats detected by the datapath services are known to those of skill in the art, so an exhaustive list is not provided here. Table 2, below, details examples of security threats with which datapath microservices in a network security system is concerned. To protect against these and other potential threats, security policies are loaded into each of the FIG. 14 microservices. Reception, conversion, compilation, and distribution of security policies is illustrated, for example, with respect to FIG. 18, below. Furthermore, a team of professionals working to support the policy update cloud 1430 provides updates to security policies according to the latest identified threat signatures, suspicious TCP/IP 5-tuples, malware, and threat behavior. In an embodiment, updated security policies are automatically loaded by compiler 1424, converted to a common network security system language, compiled into a binary, and distributed to the microservices, as illustrated and described, for example, with respect to FIG. 18, below. Upgrading an existing security policy of a microservice without powering down the system is illustrated in FIG. 25, below.

TABLE 2

Security Threats of Concern to Network Security System 1400

| Name of Security Policies | Description |
| --- | --- |
| Access Control Policy | Including Application ID and User/Account ID |
| Vulnerability-Based Exploit Policy | Foundation for signature-based Intrusion Prevention System (IPS) functionality |
| Reconnaissance Policy | Detect events that repeat more than X times in Y seconds |
| L7 DDoS Policy | Primarily aimed at application-layer attacks targeting webservers |
| Malware Delivery Policy | Extracts files from flows and hands them off to one or more engines for malware analysis. Includes file reputation service. |
| Malware Callback Policy | Detects communications from malware in situ back to a command and control server. |
| Machine, User & Application Anomaly Policy | Focused primarily on the East/West use case. Designed to detect anomalous behavior by machines, users (accounts) and applications that indicate post-breach activities, such as lateral movement. |
| DLP Monitor Policy | Logs flows of interest for detection of sensitive information embedded in data-in-motion. Permits retrospective analysis of logged traffic for DLP Prevent policy development |
| DLP Prevent Policy | Actively enforces DLP policy on data-in-motion |
| DLP Discover Policy | Searches network shares for files containing sensitive information and actively responds when such files are found out of place |

Figure 15:
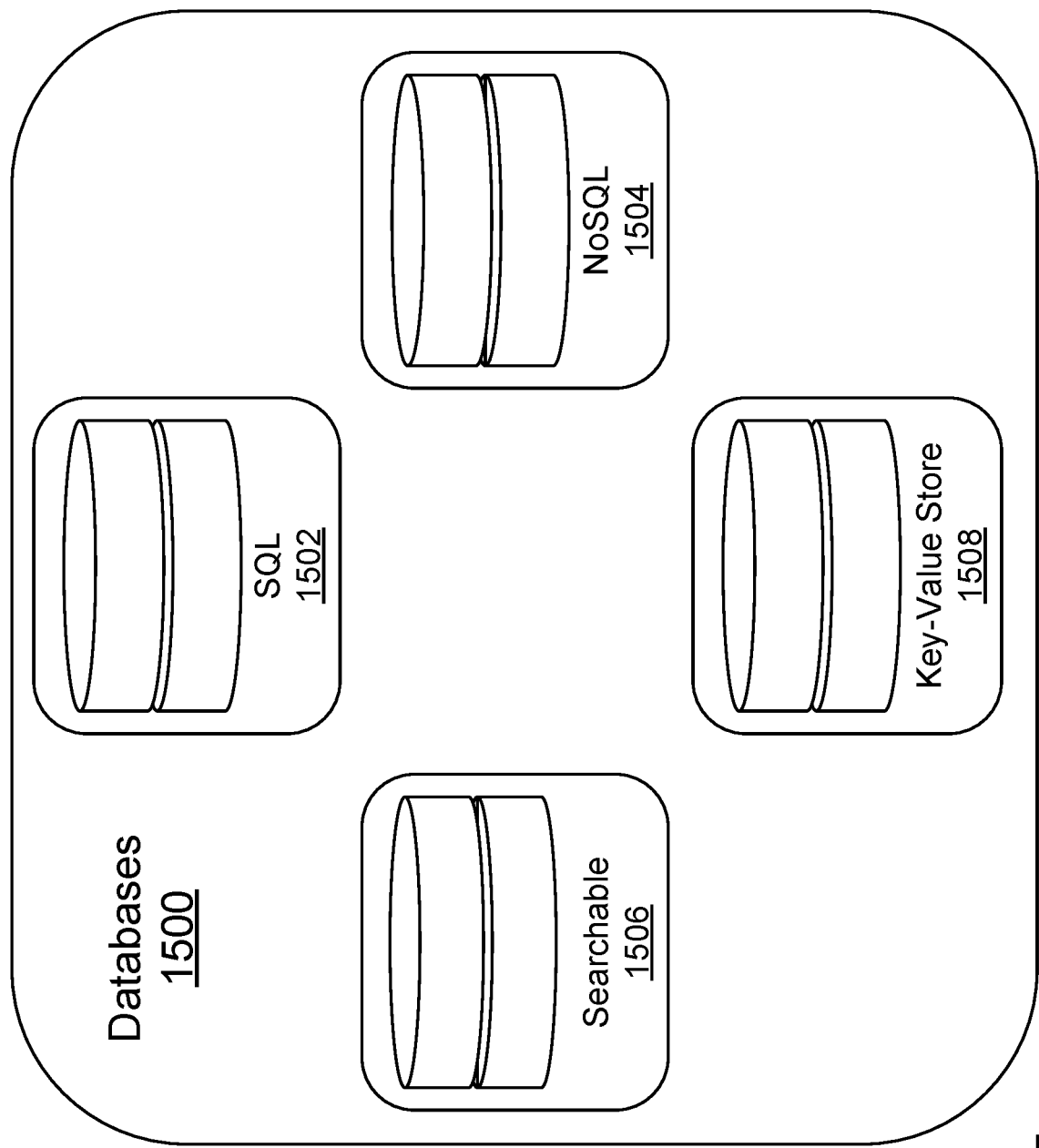
FIG. 15 illustrates multiple different database types used to support microservices according to some embodiments.

Databases 1418 (FIG. 14), as further illustrated in FIG. 15, store data for use by the microservices. In one embodiment, databases 1418 hold recently used and updated security policies to be read by the microservices as needed. Databases 1418 in some embodiments maintain state information for one or more microservices, to enable that microservice to recover from a failure and reinstitute its state when necessary. Databases 1418 in some embodiments include a searchable database to hold and allow searching of objects extracted from network traffic. In an embodiment, databases 1418 associate database entries with flow identifiers to associate data related to the same flow together. As used herein, the term stream context, refers to an additional field used to uniquely identify flows despite characteristics contained within. In an embodiment, a policy is derived from that additional field. Databases 1418 include key-value store 1508, which in one embodiment is a high-performance, small database to hold key-value pairs to hold identifiers for authenticated microservices, and to detect imposters.

FIG. 15 illustrates multiple different database types used to support microservices according to some embodiments. The choice of particular database type to use in a particular situation is selected according to a desired speed and functionality of the database. As illustrated, databases 1500 include SQL database 1502, NoSQL database 1504, searchable database 1506, and key-value store 1508. SQL database 1502, NoSQL database 1504, and searchable database 1506 in some embodiments hold files, intermediate data, extracted objects, or partially-extracted objects being used by various network security microservices. The number and types of databases are not so limited; different embodiments use more or fewer databases. Different embodiments use different types of databases.

SQL database 1502 in an embodiment implements a Relational Database Management System (RDBMS).

NoSQL database 1504 is selected according to its particular performance or ease of use characteristics. In an embodiment, NoSQL database 1504 provides a key-value store, whereby records are indexed by a key that microservices use to retrieve record data. In some embodiments, NoSQL database 1504 allows atomic operations such as incrementing counters. According to an embodiment NoSQL database 1504 includes records that also contains metadata to track the generation count (data modification), a number that returns to the microservice during read operations, and can be used to ensure that the data being written was not modified since the last read. In some embodiments, NoSQL database 1504 includes a load balancing functionality to spread database requests upon multiple database instances.

Searchable database 1506 in an embodiment conducts character recognition on extracted network files, allowing them to be searched in the searchable database. In some embodiments, searchable database 1506 makes network data available to be viewed and analyzed in substantially real-time. In an embodiment, searchable database 1506 is scalable and can automatically instantiate additional database nodes to accommodate increased traffic loads. In some embodiments, searchable database 1506 scales horizontally to make use of additional computing resources as they become available. In an embodiment, searchable database 1506 reacts to a failure of one or more of its hardware nodes by reorganizing and rebalancing data among one or more remaining, available nodes.

Key-value store 1508 maintains key-value pairs providing quick access to identifiers for authenticating microservices and detecting imposters.

In an embodiment, any one or more of databases 1502-1508 include redundancy to support fault tolerance. In some embodiments, any one or more of databases 1502-1508 allows dynamic scaling out or in to satisfy performance requirements. In an embodiment, any one or more of databases 1502-1508 is omitted or not used. In some embodiments, instead of using one or more of databases 1502-1508, a memory, such as a register file, flash memory, static or dynamic RAM, is used to store such data. Databases 1502-1508, as with the other microservices, consist of microservices and are implemented and deployed according to a microservices architecture.

Referring again to FIG. 14, messenger 1420 in one embodiment receives and stores messages, including policy updates from compiler 1424, and chassis controller 1416. Interested microservices in one embodiment subscribe to receive the messages, including policy updates, from messenger 1420. In some embodiments, a resource group is a group of objects from the infrastructure that subscribe to a policy, by a process sometimes referred to as binding a resource group to a policy. In some embodiments, a microservice pool is a group of microservices with a common set of policies and configuration. In turn, messenger 1420 publishes policy updates to subscribed microservices. Messenger 1420 in one embodiment publishes policy updates to subscribing microservices at regular time intervals. In some embodiments, messenger 1420 published policies to subscribing microservices as new or updated policy is received from compiler 1424. In some embodiments, instead of subscribing for publications from messenger 1420, microservices interested in policy updates poll one or more of messenger 1420, compiler 1424, or databases 1502-1508 to detect the existence of updates. Microservices interested in policy updates include, for example, datapath microservices such as TCP/IP microservice 1434, which is interested to receive policy updates including TCP/IP 5-tuples identifying threats. Infrastructure discovery microservice 1412 in one embodiment conducts discovery of a datacenter via interface 1426. Infrastructure discovery microservice 1412 in one embodiment receives new security policies from messenger 1420, security policies so new that a user or enterprise software has not had a chance to enable them. Accordingly, infrastructure discovery microservice 1412 causes configuration microservice 1408 to suggest the new security policy to the user or to enterprise software, via connection 1448. In an embodiment, discovery microservice causes configuration microservice 1408 to suggest that a user update any policy update.

Figure 16:
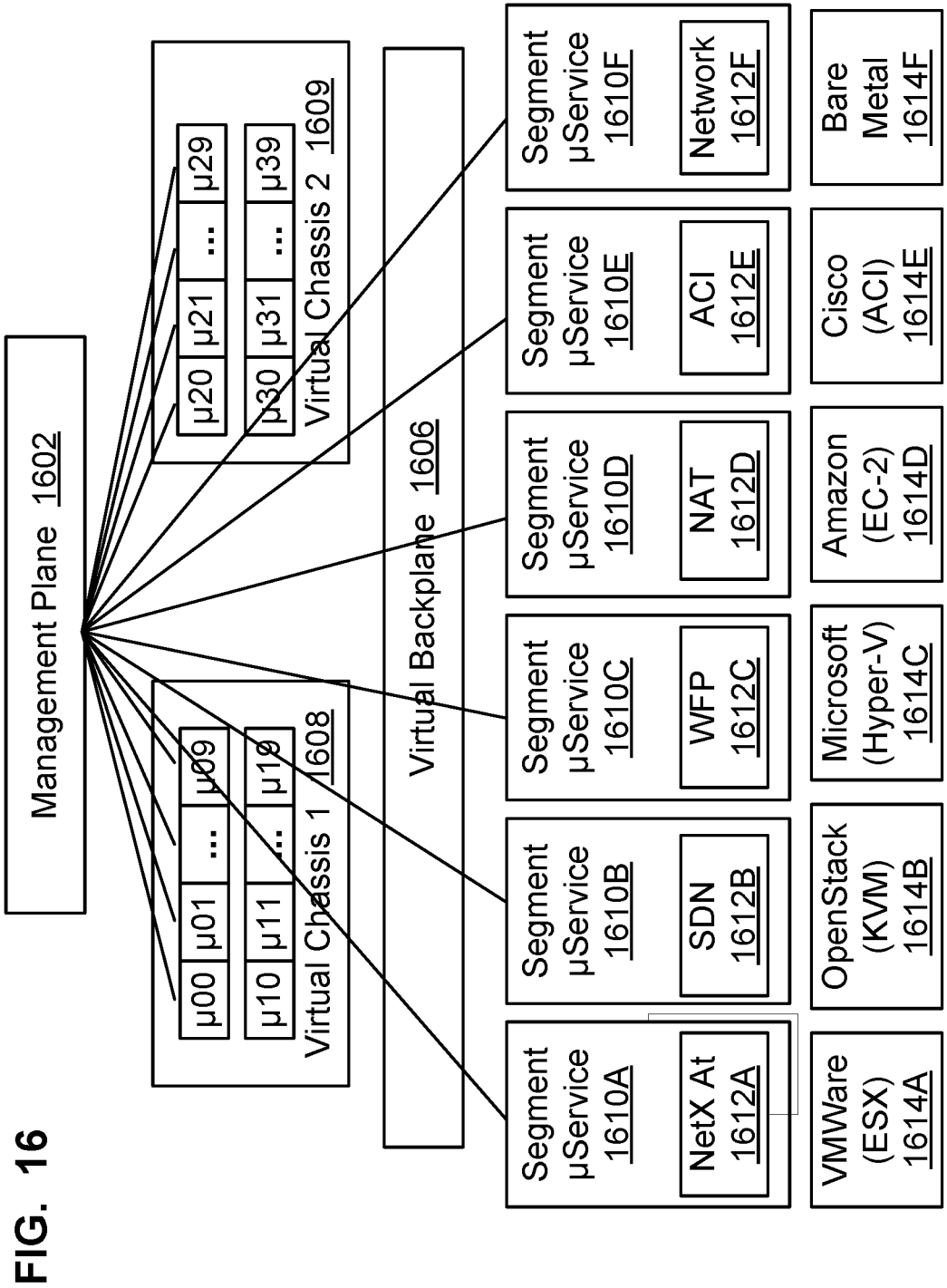
FIG. 16 is a flow diagram illustrating control packets sent from a management plane to every microservice of a network security system according to an embodiment.

FIG. 16 is a block diagram illustrating control packets sent from a management plane to one or more of the microservices of a network security system according to an embodiment. As used herein, a microservice personality, depending on policies, can be altered. A DPI microservice can for example become an engine for threat detection, URL classification, or application identification, to name a few. As used herein, an application behavioral profile defines the typical behavior exhibited by an application, and is used to derive abnormalities. As illustrated and described above, a network security system in some embodiments is integrated with a datacenter. Here, a network security system is integrated with several virtual environments in the datacenter. In particular, NetX agent 1612A is managed by VMware ESX hypervisor 1614A, SDN agent 1612B is managed by OpenStack KVM 1614B, WFP agent 1612C is managed by Microsoft Hyper-V 1614C, NAT 1612D is managed by Amazon EC-2 1614D, ACI agent 1612E is managed by Cisco ACI 1614E, and network agent 1612F is managed by bare-metal 1614F. The illustrated network security system, includes two virtual chassis, 1608 and 1609. Management plane 1602 in an embodiment exchanges control packets with virtual chassis 1608 and 1609, and with the datacenter's virtual environment 1614A-1614F.

According to an embodiment, the network security system provides segment microservices each customized to interact with existing virtual and physical systems. Here, specially-designed segment microservice 1610A interacts with VMWare ESX 1614A and NetX agent 1612A, specially designed segment microservice 1610B is designed to interact with SDN 1612B and KVM 1614B, specially-designed segment microservice 1610C is designed to interact with WFP 1612C and Hyper-V 1614C, specially-designed segment microservice 1610D is designed to interact with NAT 1612D and Amazon EC-2 1614D, specially designed segment microservice 1610E is designed to interact with ACI 1612E and Cisco ACI 1614E, and specially designed segment microservice 1610F is designed to interact with a network agent 1612F running on Bare Metal 1614F. In operation, if the network security system is deployed in-line, each of the specially-designed segment microservices 1610A-1610F is configured to intercept packets, route them through datapath microservices, and then forward them to the corresponding datacenter environment. If deployed in a "copy only" configuration, the network security system monitors traffic and generates alerts if any threats are detected or suspected.

As illustrated, management plane 1602 communicates controls with at least one of the microservices in virtual chassis 1 1608, virtual chassis 2 1609, and at least one of the datacenter environments 1610A-F, 1612A-F, and 1614A-F. Therefore, management plane 1602 of the network security system, if enabled to do so during configuration, sends control messages to any datacenter environment, even ones that were in place before deployment of management plane 1602. In operation, traffic intercepted by segment microservices 1610A-F in some embodiments is forwarded to data security microservices in virtual chassis 1 or 2, 1608 or 1609. If virtual chassis 1 1608 or virtual chassis 2 1609 detects a threat, it informs the relevant datacenter environment. In such a scenario, in some embodiments, management plane 1602 sends a "halt" message to the relevant datacenter environment. In alternate embodiments, in such a scenario, management plane 1602 instructs one or more of hypervisors 1614A-1614F to reboot or restart its associated microservice.

Figure 17:
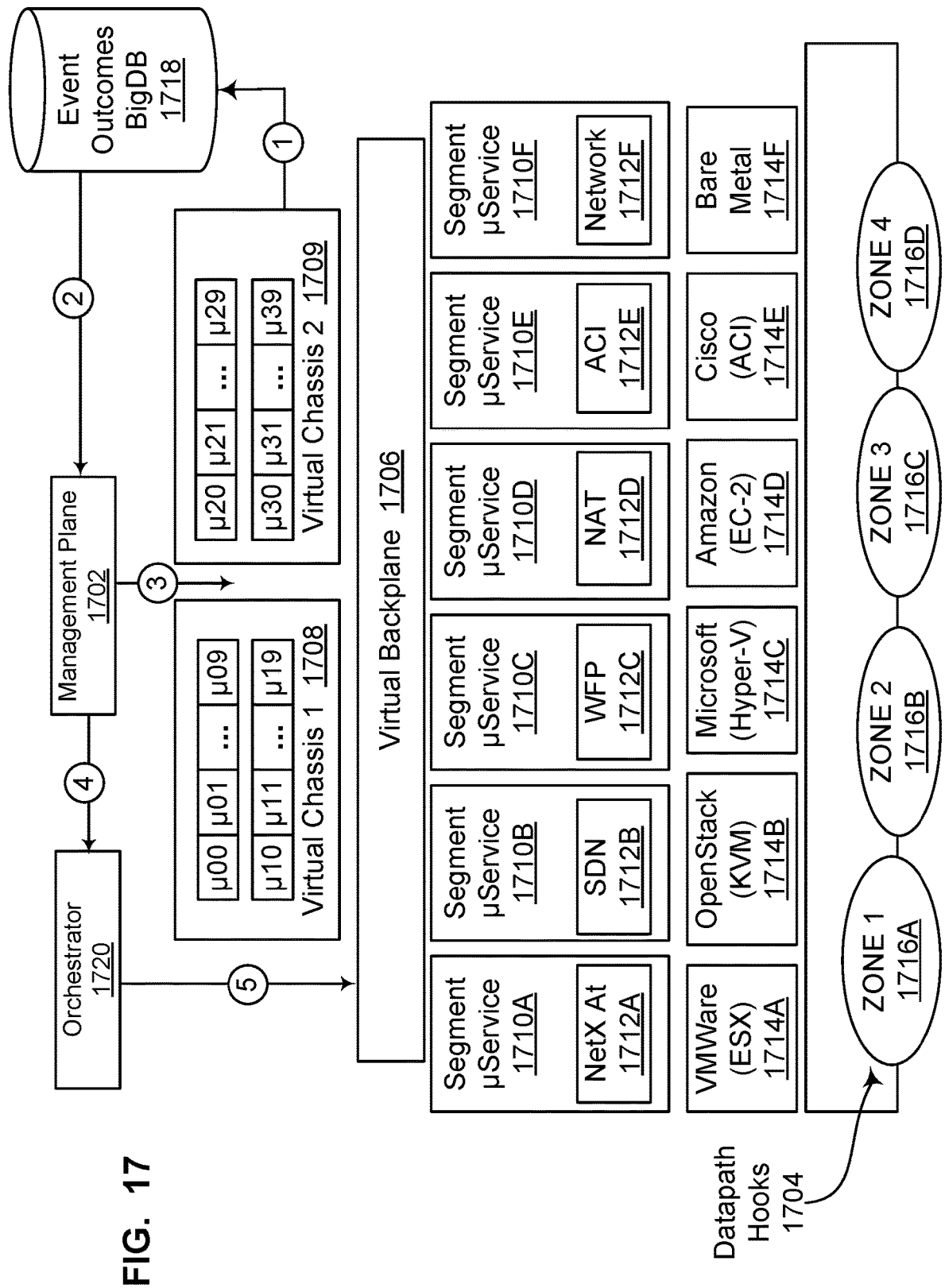
FIG. 17 is a block flow diagram illustrating a network security system response to a threat event according to an embodiment.

FIG. 17 is a block flow diagram illustrating a network security system response to a threat event according to an embodiment. As illustrated, a security threat, indicated as number '1,' is detected by a microservice in virtual chassis 2 1709. The threat is transferred, via the arrow indicated as number '1,' to and stored in Event Outcomes BigDB 1718. The threat is then transferred, via the arrow indicated with the label, '2,' to management plane 1702. Management plane 1702, in turn, checks its security policies and determines whether a response to the detected threat calls for informing orchestrator 1720, via the arrow labeled as '4,' to shut down and restart one or more microservices of the network security system. Orchestrator 1720 responds by calling for, via the arrow labeled as '5,' a shut-down and restart of one or more microservices among 1710A-F, 1712A-F, and 1714A-F. Management plane 1702 responds to the detected threat in some embodiments by shutting down, restarting, or otherwise modifying, via the arrow labeled as '3, at least one microservice among 1710A-F, 1712A-F, and 1714A-F and the microservices of virtual chassis 1 and 2, 1708 and 1709.

Figure 18:
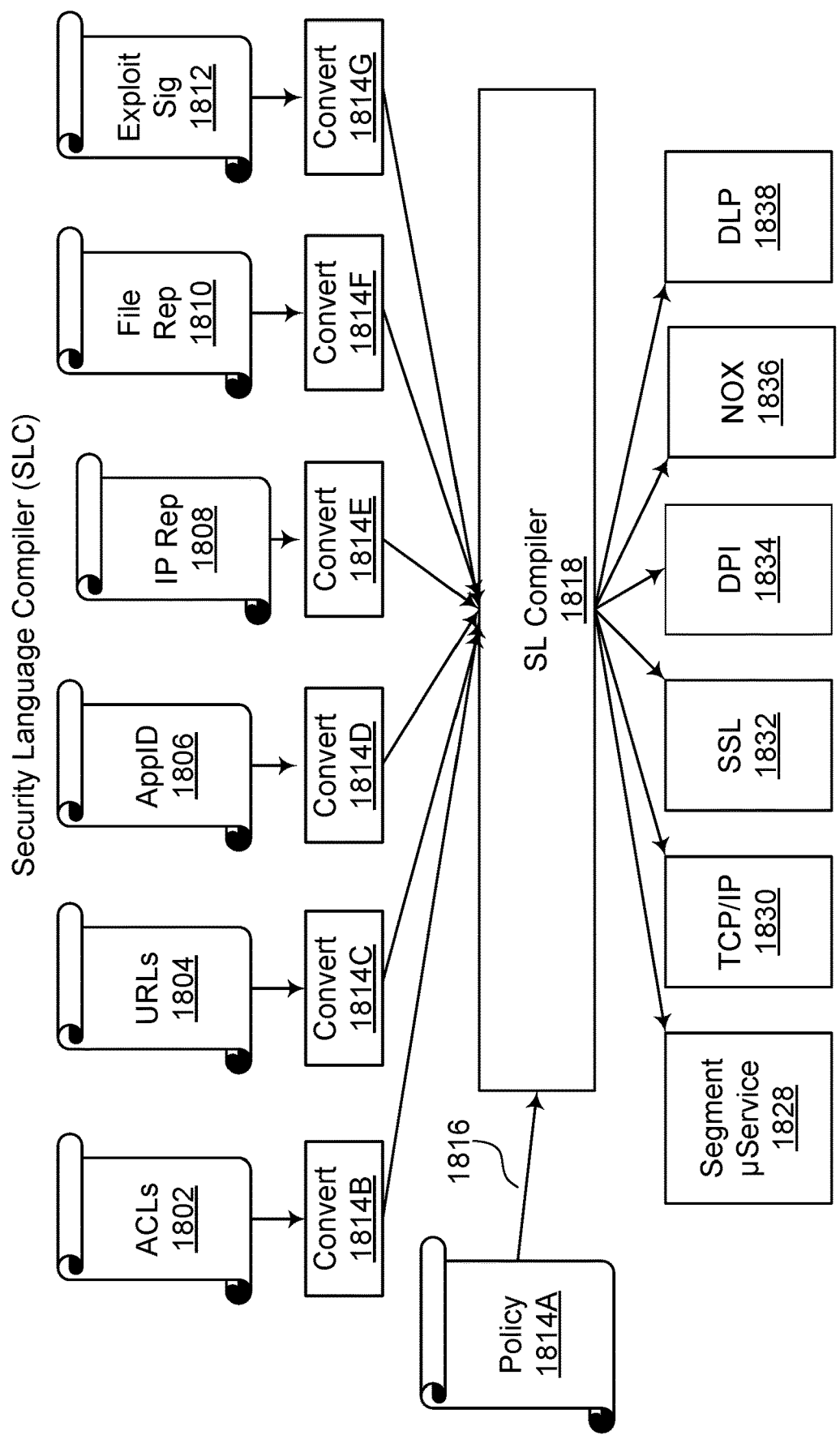
FIG. 18 is a flow diagram illustrating receiving security policies, converting them into a security language, compiling them into binaries, and loading them into the microservices according to an embodiment.

FIG. 18 is a flow diagram illustrating receiving security policies, converting them into a security language, compiling them into binaries, and loading them into the microservices according to an embodiment. As illustrated, a network security system receives new or updated security policies, including ACLs 1802 (Access Control Lists. TCP/IP N-tuple-based signatures), URLs 1804 (Uniform Resource Locators), AppID's 1806 (Application ID's), IP Rep 1808 (Internet Protocol representation), File Rep 1810 (file representation), Exploit signature 1812, and policy 1814A. In some embodiments, network security system 1800 provides converters, 1814B-1814G, customized to receive and convert messages with different message formats. Converters 1814B-G convert incoming signatures to a common language understood by SL compiler 1818, which compiles the signatures into binary or other representation understood by the microservices 1828-1838. In some embodiments, once compiled, the new or updated signatures are placed in a messenger, such as messenger 1420 (FIG. 14), to be consumed by interested microservices. In some embodiments, SL Compiler 1818 bypasses the messenger, such as the messenger 1420 (FIG. 14), and publishes the new or updated policies directly to interested microservices. In some embodiments, once compiled, the new or updated signatures are placed in a database, such as databases 1418 (FIG. 14).

Figure 19:
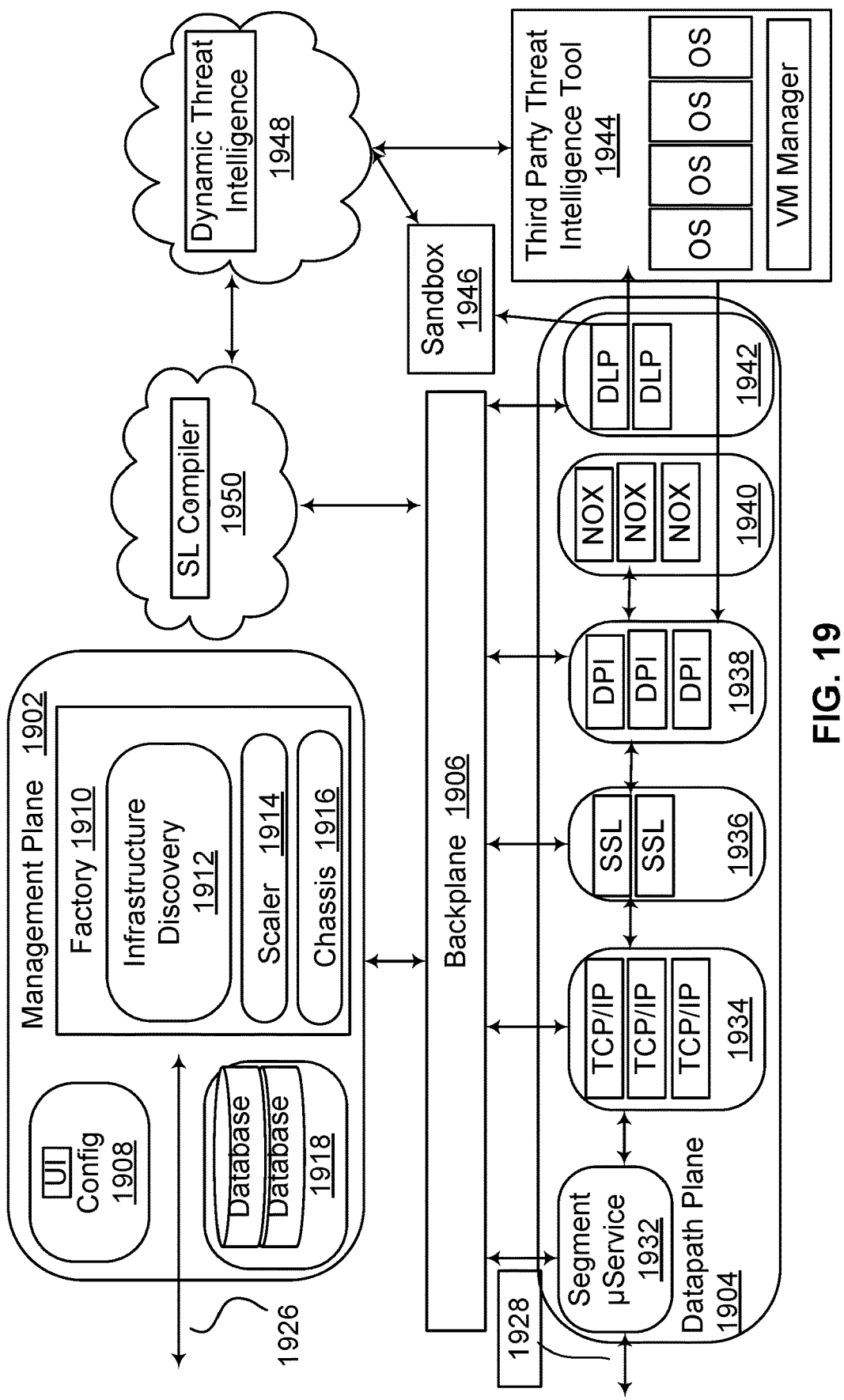
FIG. 19 is a block diagram illustrating a network security system interfacing with third party security tools according to an embodiment.

FIG. 19 is a block diagram illustrating a network security system interfacing with third party security tools according to an embodiment. As illustrated, a network security system includes management plane 1902, backplane 1906, and datapath plane 1904. As illustrated, management plane 1902 utilizes a factory 1910, which includes infrastructure discovery microservice 1912, scaler microservice 1914, chassis controller microservice 1916, and databases 1918. In some embodiments, factory 1910 comprises a microservices virtualization environment defined according to a factory model, as described above. Management plane 1902 also includes configuration microservice 1908, which in some embodiments functions similarly to configuration microservices 1408, as illustrated and described with respect to FIG. 14. As illustrated, management plane 1902 and datapath plane 1904 include interfaces 1926 and 1928 to communicate with a datacenter.

Datapath plane 1904, as illustrated, includes segment microservice 1932, TCP/IP microservice 1934, SSL microservice 1936, DPI microservice 1938, NOX microservice 1940, and DLP microservice 1942. As these microservices were described above with respect to FIG. 14, their description will not be repeated here. FIG. 19 illustrates third party threat intelligence tool 1944, sandbox 1946, and dynamic threat intelligence 1948. In an embodiment, third party threat intelligence tool 1944 is contacted by DPI microservice 1938, NOX microservice 1940, or DLP microservice 1942, via an electronic communication link when any of those microservices encounters a file type, a file contents, a signature, a TCP/IP 5-tuple characteristics, a suspicious binary, or a suspicious code sequence, but unknown to any security policy. In such circumstances, datapath plane 1904 forwards data to third party threat intelligence tool 1944 for analysis.

In an embodiment, third party intelligence tool 1944 provides a communication link and defines an API which datapath plain 1904 uses to communicate with it. In some embodiments, third party threat intelligence tool 1944 compares the forwarded data to patterns of behavior known to it that match a threat known to third party threat intelligence tool 1944. In an embodiment, third party threat intelligence tool 1944 is associated with a global network of network security tools and services, with whom it regularly exchanges knowledge of third party threats. In the illustrated embodiment, third party threat intelligence tool 1944 instantiates four virtual machines to operate four operating systems, and those virtual machines are managed by a hypervisor.

In turn, if third party threat intelligence tool 1944 detects and resolves a threat, it informs dynamic threat intelligence 1948 of a new security policy to cover that new threat. In one embodiment, dynamic threat intelligence 1948 consists of a manned or automated security office that receives updates and publishes them to security microservices. In an embodiment, dynamic threat intelligence 1948 then forwards the updated security policies to SL compiler 1950, which in an embodiment converts the policy feeds into a common language, compiles them into binaries, and causes them to be distributed to the microservices, as described with respect to FIG. 18.

In some embodiments, sandbox 1946 is contacted when DPI microservice 1938, NOX microservice 1940, or DLP microservice 1942 encounters a file type, a signature, a TCP/IP 5-tuple characteristics, a binary, or a code sequence that is suspicious, but unknown to any security policy. In such a scenario, suspicious but unknown data and packets are forwarded to sandbox 1946, where untested code, or untrusted programs from unverified third parties, suppliers, untrusted users and untrusted URLs are tested. Anything learned from sandbox 1946 is fed to dynamic threat intelligence 1948, and then to SL compiler 1950, which in an embodiment converts the policy feeds into a common language, compiles them into binaries, and causes them to be distributed to the microservices, as described with respect to FIG. 18.

Figure 20:
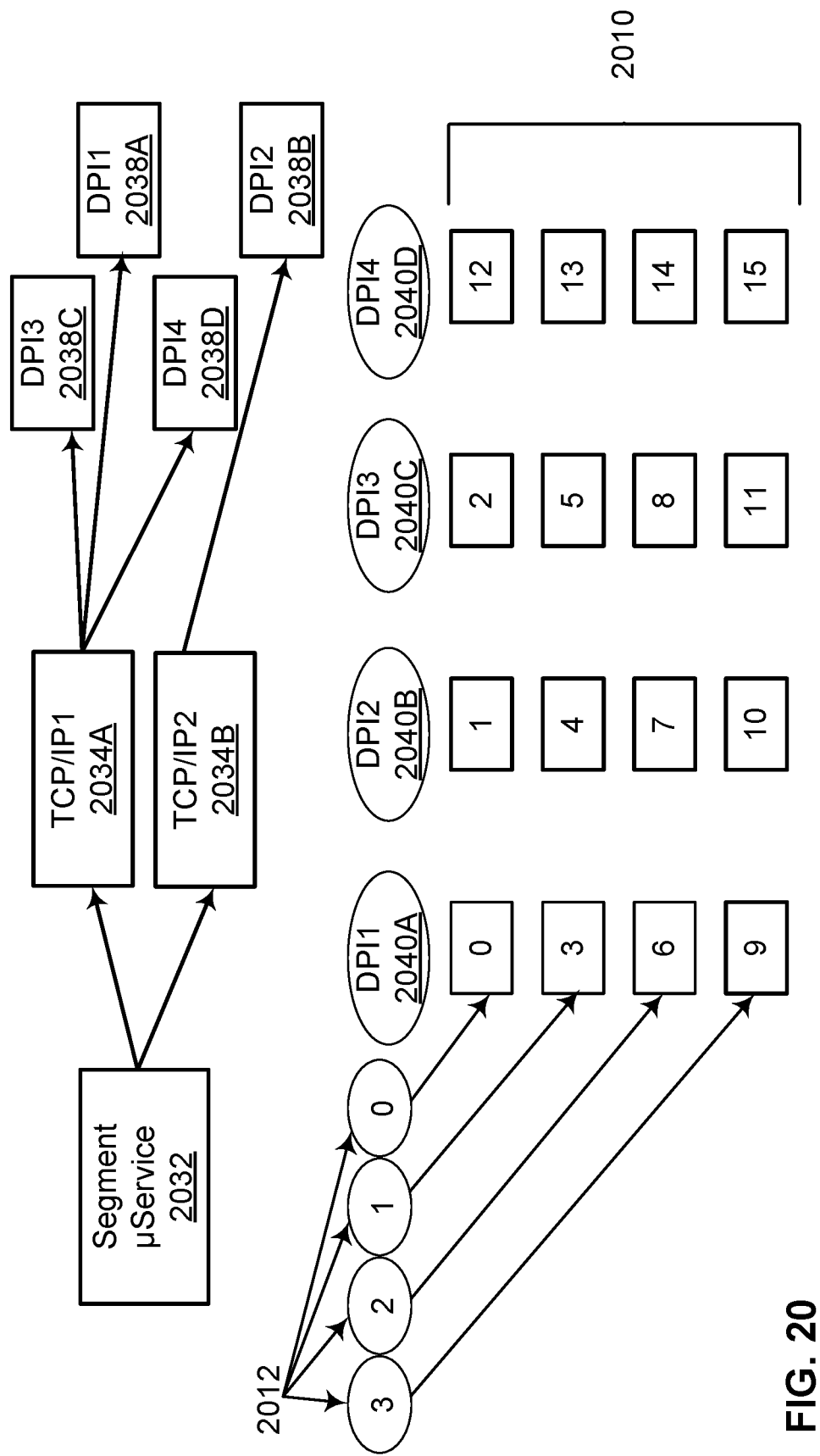
FIG. 20 is a flow diagram illustrating load stacking data packets into microservices queues according to an embodiment.

FIG. 20 is a flow diagram illustrating load stacking data packets into microservices queues according to an embodiment. Some embodiments perform context-based load stacking, which refers to an approach to distribute load among microservices. Illustrated are segment microservice 2032, two instances of TCP/IP microservice 2034A-B, and four instances of DPI microservice 2036A-D. Focusing on DPI data queues 2040A-D, each DPI microservice has a queue comprising four "buckets" or "slots" for holding data. The 16 total buckets are labeled as 2010. In an embodiment, incoming data packets 2012 are load-stacked into the first available microservice queue. As used herein, load-stacking refers to loading up a first queue to a threshold level before loading packets into a second queue. Load-stacking has the benefit of minimizing the number of microservices used, such that the unused microservices are powered down to save power. Load-stacking also has the benefit of having substantially empty queues available to support scaling out a microservice. In some embodiments, the four incoming packets are balanced by being spread evenly to all our microservice queues, a load balancing approach enabling the network security system to make do with lower performance microservices.

Figure 21:
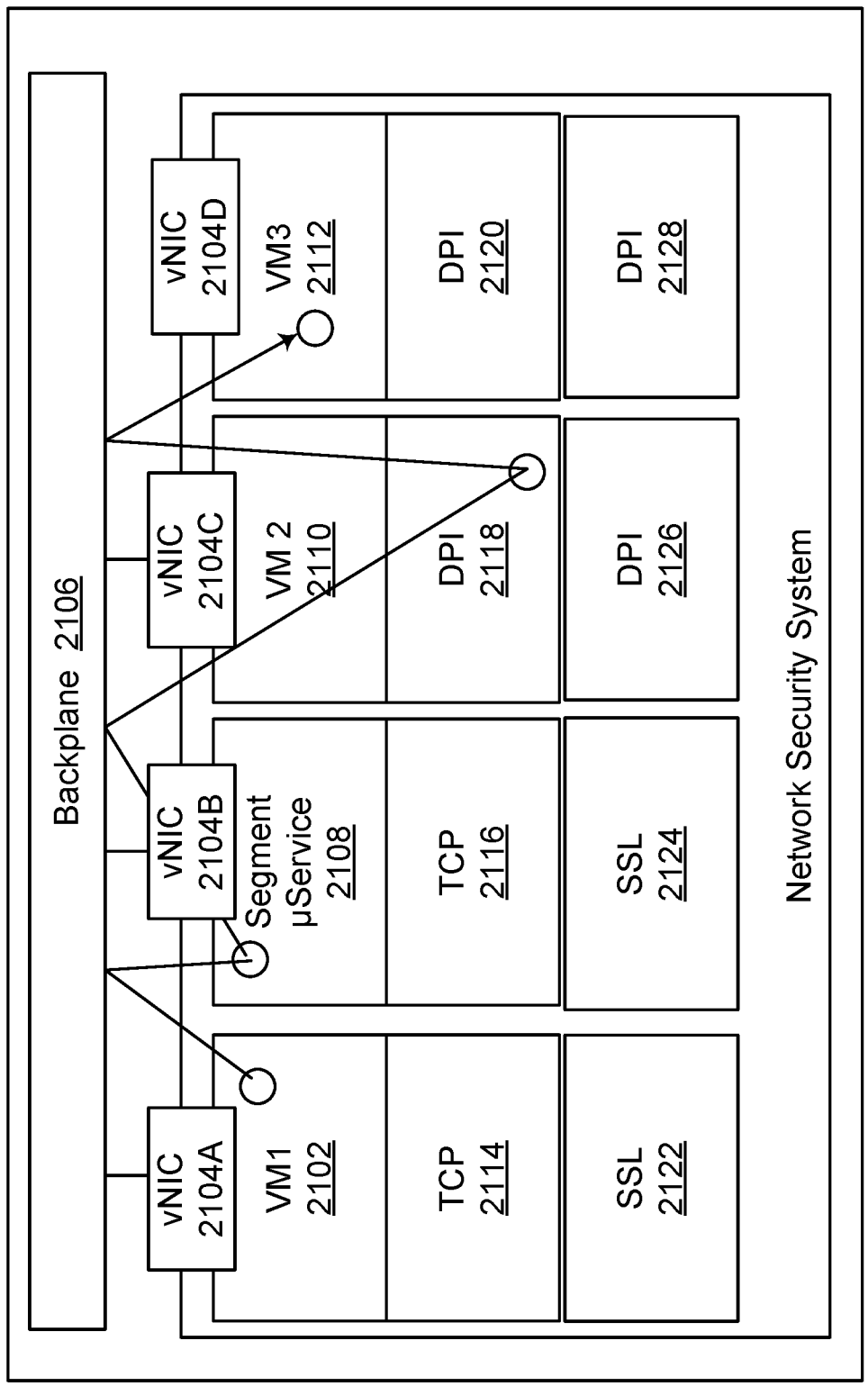
FIG. 21 is a block diagram illustrating intra-system data communication according to an embodiment.

FIG. 21 is a block diagram illustrating intra-system data communication according to an embodiment. As illustrated, the datacenter has been partitioned into four virtual network interface cards, 2104A-D including various microservices 2102, 2104A-D, 2106, 2108, 2110, 2112, 2114, 2116, 2118, 2120, 2122, 2124, 2126, and 2128. In an embodiment, communications between virtual line cards in an embodiment are not direct; communications first go to backplane 2102, and then to the destination line card. FIG. 21 illustrates three communication paths: from VM1 2102 to segment microservice 2108 using 2106 as a go-between, from segment microservice 2108 to DPI 2118 using 2106 as a go-between, and from DPI 2118 and VM3 2112 using 2106 as a go-between. In other embodiments, any communications from one management microservice to another uses this same two-step process, using the backplane 2106 as a go-between.

Figure 22:
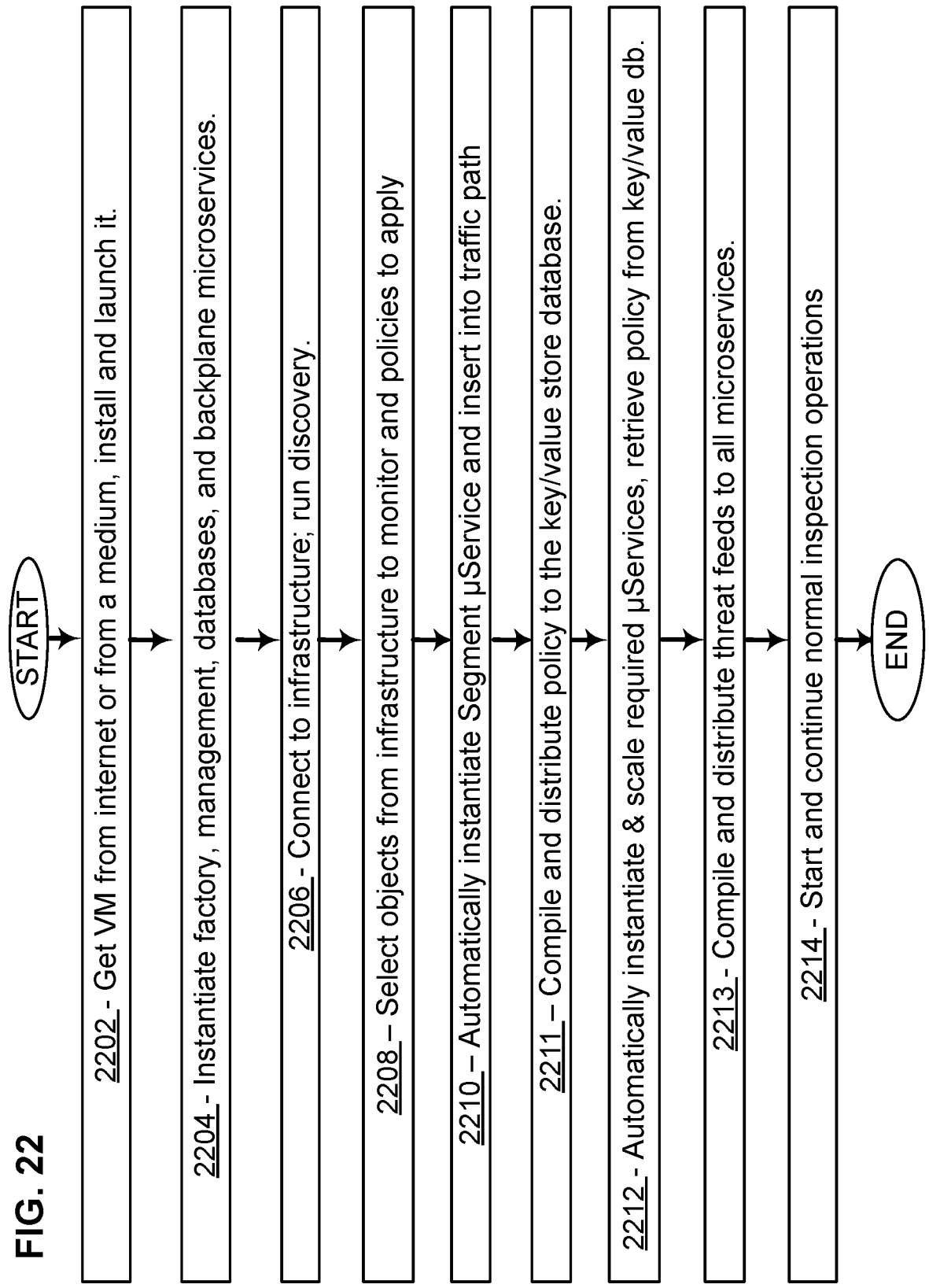
FIG. 22 illustrates a block diagram of a network security system including management microservices and datapath microservices according to an embodiment.

FIG. 22 is a flow diagram illustrating a process of selecting microservices to install for providing network security to a data center according to an embodiment. As illustrated, after starting, at 2202 a virtual machine (VM) is downloaded from the internet or from a computer-readable medium, then installed and launched. At 2204, a factory, such as factory 1410 (FIG. 14) is instantiated, as are a management plane, such as management plane 1402 (FIG. 14), a backplane, such as backplane 1406 (FIG. 14), and database microservices, such as database microservices 1418 (FIG. 14). After 2204, the microservices are contacted as a pool, rather than individually. Next, at 2206, discovery microservices, such as discovery microservices 1422 (FIG. 14) connect to a datacenter, such as datacenter 830 (FIG. 8) and conduct discovery. Discovery at this state consists of identifying networks and servers that are candidates for deployment of security services and mapping the connectivity among those elements. At 2208, desired microservices are selected by configuration microservices, such as configuration microservices 1408 (FIG. 14), using a user interface or receiving RESTful instructions from enterprise software. At 2210, selected segment microservice and various datapath microservices are instantiated. At 2211, a policy is compiled and distributed to the key/value store database. At 2212, a policy is microservices are automatically instantiated and scaled, and policies are retrieved from the most current source, such as the installation image, product website or app store or other location. Though not shown in FIG. 22, as 2212 is executed to configure the microservices with their security policies, a network security system also updates key-value store 1508 (FIG. 15) to securely store and provide fast access to all keys being used for encrypted communications. At 2213, threat policies are compiled by the configuration microservice, and distributed to all microservices. Finally, at 2214 normal inspection operations start and continue.

After completing the process to install, configure, and run the network security system microservices, a compiler microservice 1418 (FIG. 14), in one embodiment, regularly checks policy update cloud 1430 (FIG. 14) for updated policies or new microservices. In some embodiments, policy update cloud 1430 (FIG. 14) pushes a new policy or new microservice to compiler microservice 1418 (FIG. 14). In either case, the network security system updates its microservices, as illustrated and described below with reference to FIG. 25.

Figure 23:
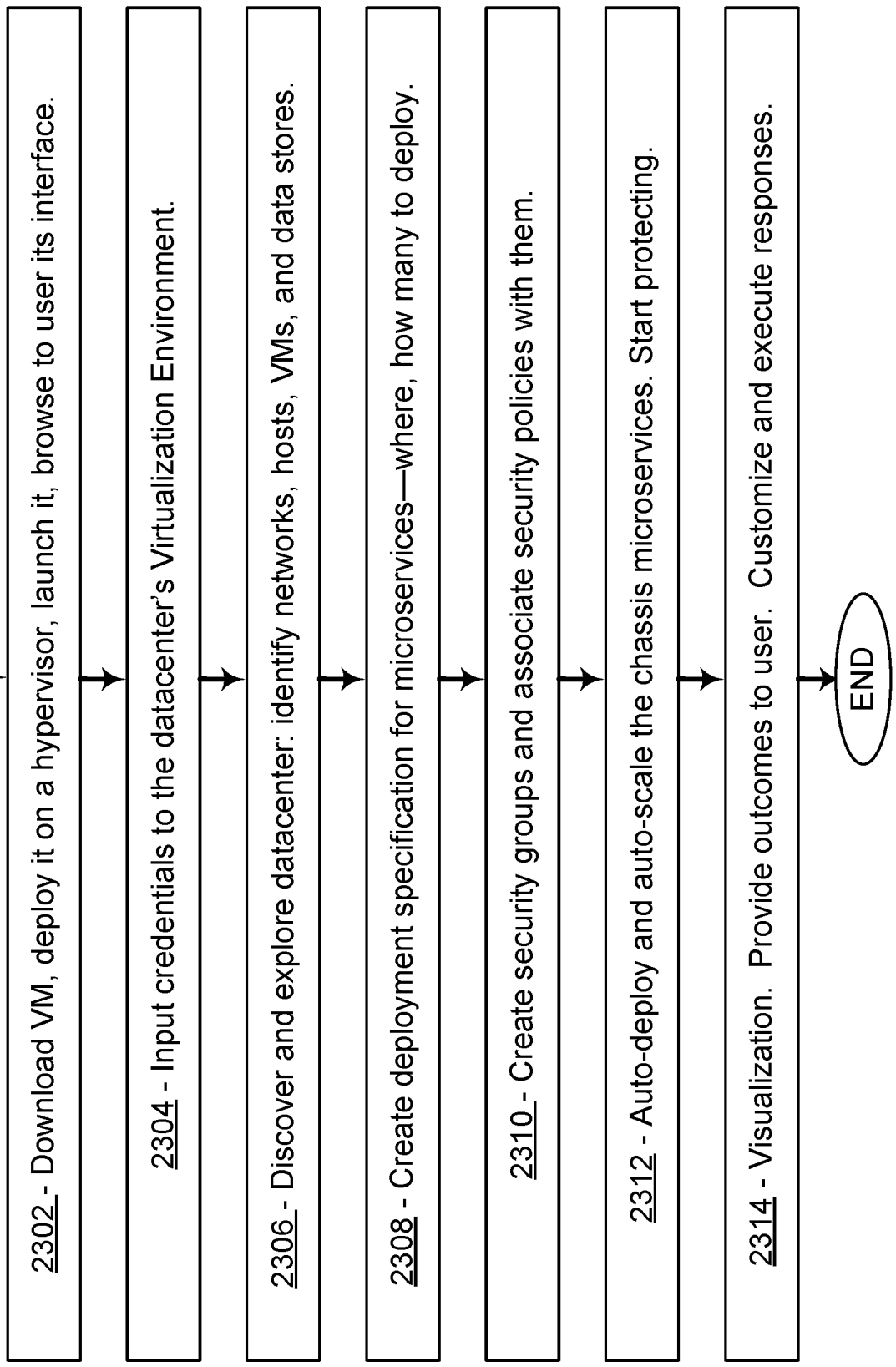
FIG. 23 is a flow diagram illustrating a process of installing and configuring a network security system to provide network security for a datacenter according to a deployment specification.

FIG. 23 is a flow diagram illustrating an embodiment of a process of installing and configuring a network security system to provide network security for a datacenter according to a deployment specification. As used herein, a deployment specification defines parameters for instantiating microservices (location, data store, networks, etc.) At 2302 a virtual machine is Downloaded, deployed on a hypervisor, launched, and its user interface accessed. At 2304 credentials to the datacenter's Virtualization Environment are provided to the VM. At 2306 infrastructure an infrastructure discovery microservice, such as infrastructure discovery service 1312 (FIG. 13), explores the datacenter: and identifies networks, hosts, VMs, and data stores. The profile discovered by discovery microservices 1312 (FIG. 13) allow configuration microservices 1314 (FIG. 13) to suggest deployment options and to configure the microservices. As used herein, configuration of a microservice defines a set of variable data that defines the microservice behavior independent of a policy. The suggested deployment options also include any available new security policies and available microservice types. At 2308 a microservices deployment specification is created, including specifying where and how many microservices to deploy. In an embodiment, the microservices deployment specification is conveyed to a user interface or to enterprise software, which confirms the specification and accepts suggested microservice upgrades. A user or enterprise software controls the deployment specification, including enforcing limitations on where and how many microservices to deploy. At 2310 security groups are created and associated with security policies. At 2312 the microservices are automatically-scaled. Then the microservices start protecting and deriving security outcomes. At 2314 outcomes are generated and provided, and responded to with customizable responses.

Figure 24:
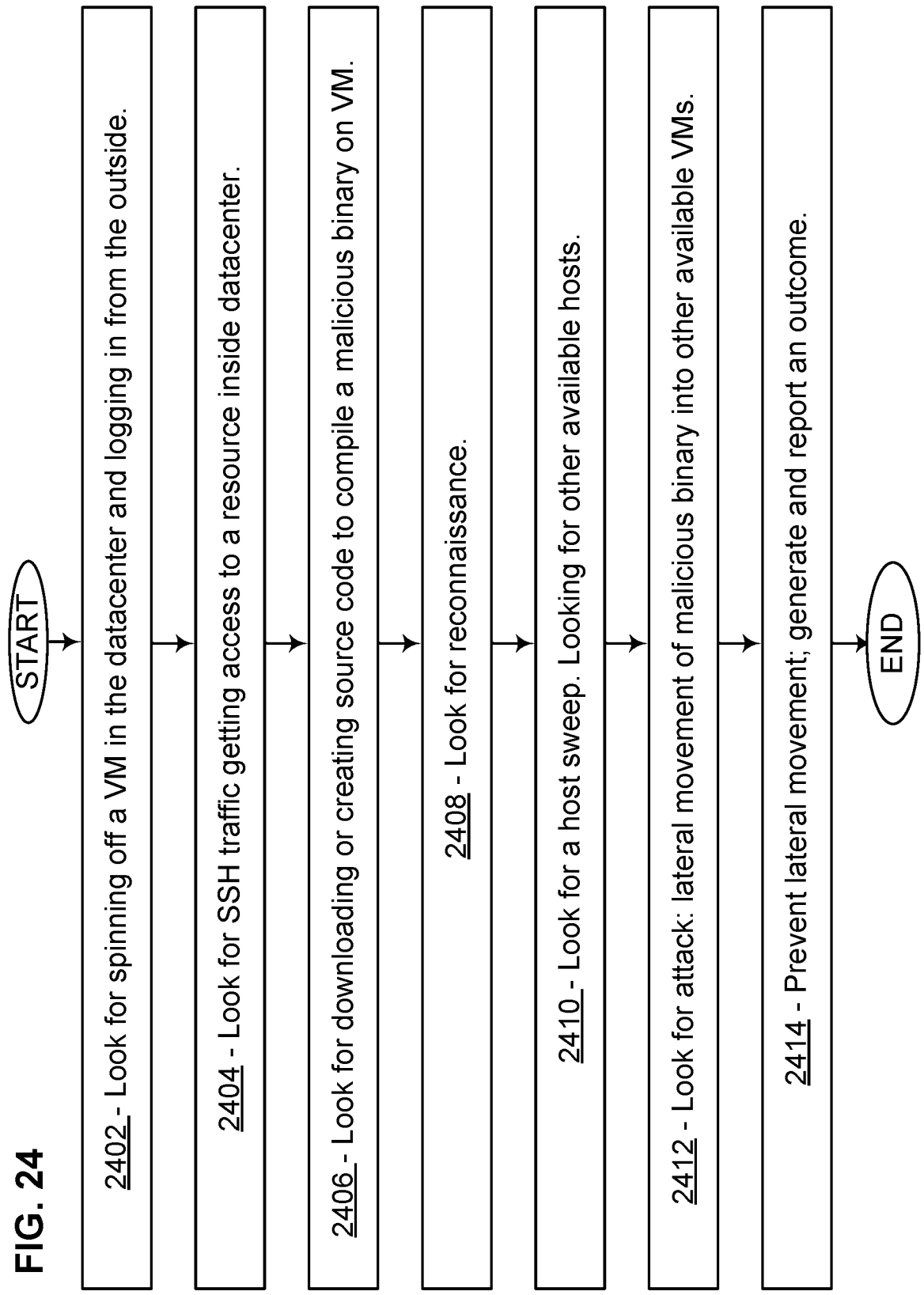
FIG. 24 is a flow diagram illustrating a process of processing a data flow through a network security system according to an embodiment.

FIG. 24 is a flow diagram illustrating a process of processing a data flow through a network security system according to an embodiment. At 2402 the network security system detects a VM in the datacenter being spun off from the outside, then logged in to. Using social engineering, outside hackers in an embodiment find a way to log in to the datacenter's Virtual Machine Manager. At 2404 SSH traffic is detected (i.e. secure shell commands getting access to a resource inside datacenter). At 2406 downloading or creation of a malicious binary, or even creating source code to be compiled into a malicious binary is detected. At 2408 reconnaissance (See Table 2, above) using binaries to scan for other VM hosts is detected. Similarly, at 2410 a host sweep looking for other available hosts is detected. Such a host sweep is visible to the network security system, which is integrated with the datacenter, but is not visible outside the datacenter. At 2412 the attack is detected, the attack being an attempt to laterally move the malicious binary into other available VM's. Since the network security system already saw the reconnaissance at 2408, it is known that a person (a hacker) is looking for another available VM. At 2414 the attack and associated lateral movement is prevented, and a report generated, because it has not been seen before. In addition, zero-day attacks are detected by observing an unknown binary bouncing around among the VMs. As illustrated, the network security system detected a suspicious event at 2402, 2404, 2406, 2408, 2410, and 2412. However, responsive measures in some embodiments are taken if a subset of those events is detected. This is a Zero-day attack.

FIG. 25 is a flow diagram illustrating a process of upgrading a microservice security policy during runtime without powering down a network security system according to an embodiment. At 2502 the compiler (shown as element 1950 in FIG. 19) detects and downloads a new microservice. At 2504, a discovery microservice tells the orchestrator to instantiate it. At 2506, the new microservice is installed into the customer's datacenter. At 2508, a security policy is retrieved and applied to the new microservice, which is then ready for traffic. At 2510, the chassis controller 1416 (FIG. 14) directs a predecessor microservice to the new microservice. For example, when installing a new TCP/IP microservice, the predecessor is the segment microservice. As a further example, if installing a new SSL microservice, the predecessor is TCP/IP microservice. At 2512, the chassis controller tells old microservice to save its state and tells the new microservice to pick it up. 2514 the predecessor microservice adjusts its load stacking algorithm to forward packets to the new microservice. The new microservice continues to receive traffic, while the old microservice is receiving less and less. As a result, a microservice is upgraded without affecting or even involving the remaining microservices. This also allows a particular microservice to be upgraded without powering down the system.

Figure 26:
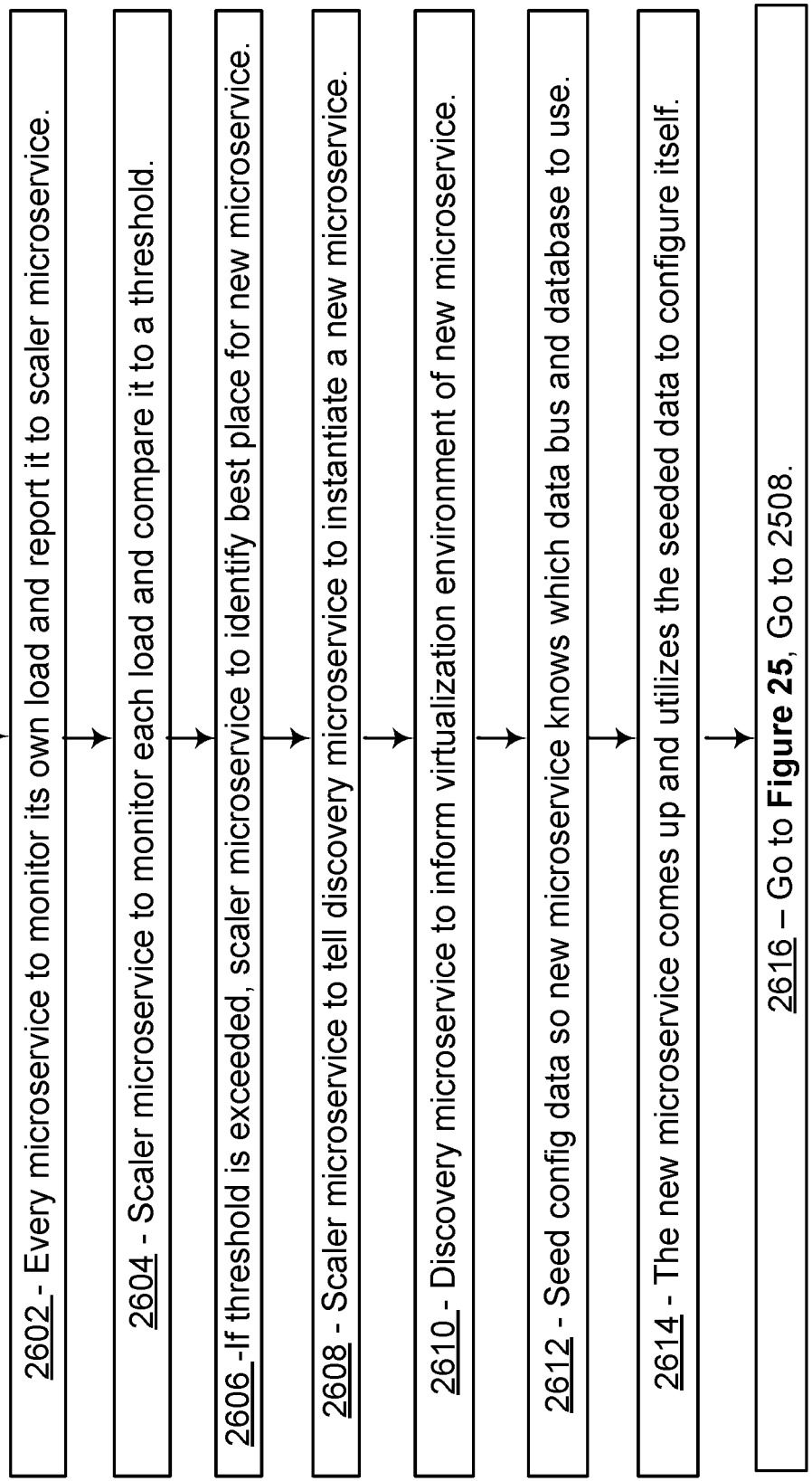
FIG. 26 is a flow diagram illustrating a process of dynamically scaling out a microservice without powering down a network security system according to load conditions according to an embodiment.

FIG. 26 is a flow diagram illustrating a process of dynamically scaling out a microservice without powering down a network security system according to load conditions according to an embodiment. At 2602, a microservice monitors its own load and reports it to the scaler microservice. In one embodiment, a microservice's load reflects the number of packets being received from a predecessor microservice. In some embodiments, a microservice's load reflects the current depth of data queues within the microservice. At 2604, scaler microservice monitors the load for each microservice and compares it to a threshold. At 2606, if a threshold is exceeded, scaler microservice 1414 (FIG. 14) identifies the best place for a new microservice. In an embodiment, indenting the best location for a new microservice takes into account the load on other related or unrelated microservices, the throughput of the datapath plane or the network security system as a whole, the latency of packets travelling through the datapath plane, and the availability of features or resources. Quality of Service requirements provided by the user or by enterprise software during configuration, for example, at block 2208 (FIG. 22) are considered when deciding whether and where to install a new microservice. In one embodiment, scaler 1414 (FIG. 14) applies a "lazy" policy, requiring more support to instantiate a new microservice. For example, in applying a "lazy" policy, scaler 1414 (FIG. 14), before instantiating a new microservice, requires a minimum number of highly loaded microservices, or a minimum duration of an overloaded condition, or a potential bottleneck, or other evidence suggesting a need for an additional microservice. In some embodiments, scaler 1414 (FIG. 14) applies a "vivacious" policy, freely instantiating additional microservices and analyzing the microstructures' loading statistics with a bent toward instantiating addition microservices. At 2608, if scaler 1414 determines that a new microservice instance is needed, it tells infrastructure discovery microservice 1412 (FIG. 14) to instantiate the new microservice instance. At 2610, infrastructure discovery microservice 1412 (FIG. 14) informs virtualization environment of new microservice. (As used herein, a virtualization environment manages instantiation and deployment of microservices on the customer-side of the datacenter being protected. At 2612, seed configuration data is prepared for use by the new microservice, so that new microservice will know what data bus and which database use. At 2614 the new microservice comes up and utilizes the seeded data to configure itself. At 2616 control is transferred to 2508 of FIG. 25.

Figure 27:
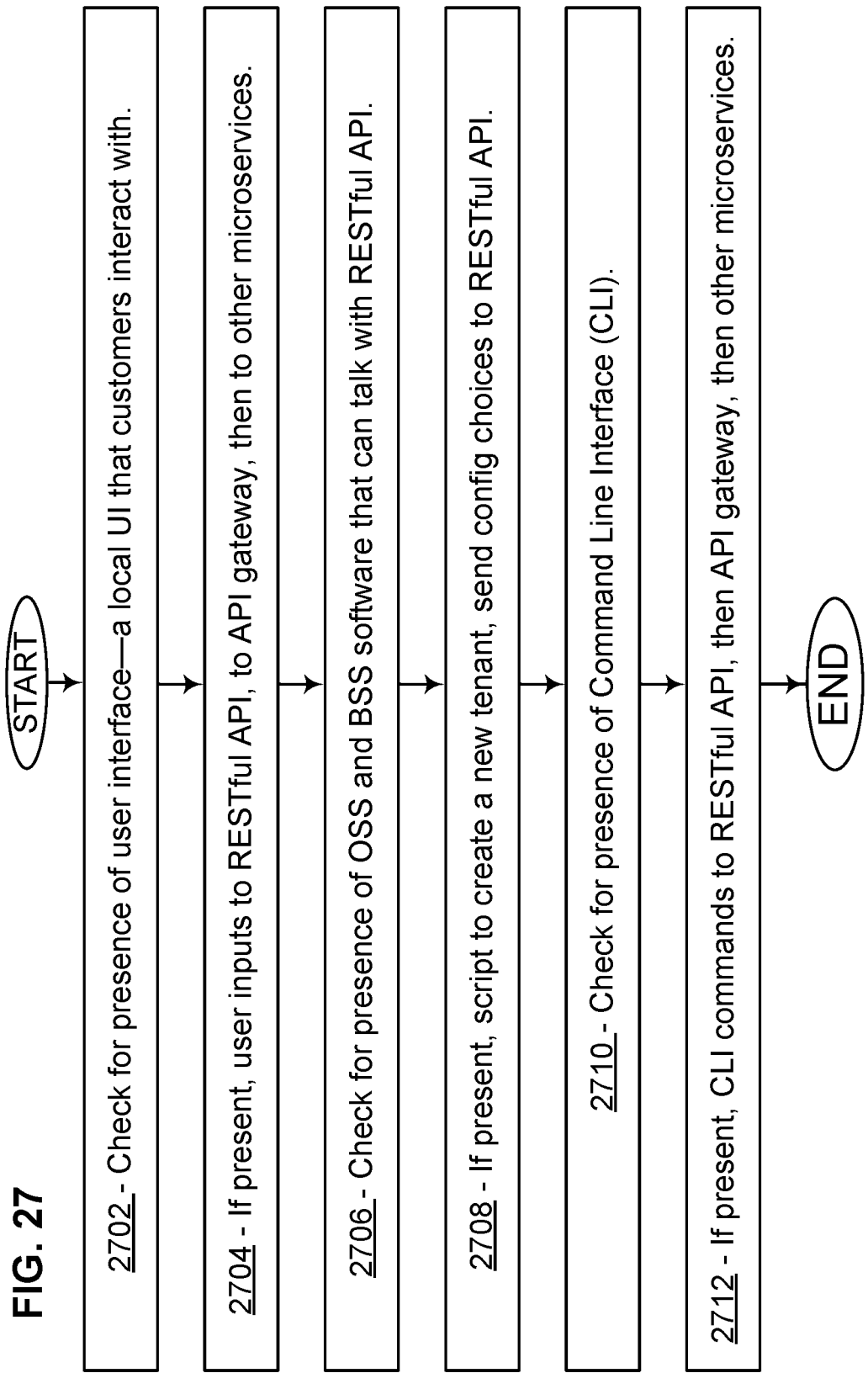
FIG. 27 is a flow diagram illustrating a process of interacting with a network security system locally or remotely according to an embodiment.

FIG. 27 is a flow diagram illustrating a process of interacting with a network security system locally or remotely according to an embodiment. As illustrated, process 2700 attempts three different ways of interfacing with the network security system. At 2702, the presence of a user interface is checked, the user interface being a local UI that customers interact with. At 2704, a user inputs choices to the UI, which are conveyed using RESTful API, and to API gateway and subsequently to other microservices. At 2706, the presence of OSS (Operational Support Systems) or BSS (Business Support Systems) software that talks with RESTful API is determined. At 2708, OSS/BSS software uses RESTful communication to deliver desired configurations to RESTful API, then API gateway, then other microservices. At 2710, the presence of a Command Line Interface (CLI) is determined. At 2712, CLI commands are prepared and delivered to RESTful API, then API gateway, then other microservices.

In the foregoing specification, specific exemplary embodiments have been disclosed. It will, however, be evident that various modifications and changes may be made thereto without departing from the broader spirit and scope of the invention as set forth in the appended claims. The specification and drawings are, accordingly, to be regarded in an illustrative rather than a restrictive sense.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in machine-executable instructions. The instructions can be used to cause a general-purpose or special-purpose processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments might be performed by specific hardware components that contain fixed-function logic for performing the steps, or by any combination of programmed computer components and fixed-function hardware components.

Instructions used to program circuitry to perform the at least one embodiment can be stored within a memory in the system, such as DRAM, cache, flash memory, or other storage. Furthermore, the instructions can be distributed via a network or by way of other computer readable media. Thus a computer-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

In some embodiments, systems, apparatuses, computer-implemented methods are described that include performing one or more of creating a new microservice of a first hierarchy, configuring data plane connectivity between the new microservice and a microservice of a second, higher-level hierarchy, configuring data plane connectivity between the new microservice and a microservice of a third, lower-level hierarchy, and configuring the microservices of the third, lower-level hierarchy to include the new microservice in load balancing decisions to the first hierarchy. In some embodiments, a new microservice is created by an existing microservice. In some embodiments, the existing microservice is a configuration microservice. In some embodiments, the new and existing microservices communicate over a backplane. In some embodiments, the new microservice is configured to use the data plane. In some embodiments, there exists, prior to a creation of the new microservice, a microservice of a same hierarchy level as the new microservice. In some embodiments, the load balancing decision utilizes information from microservices of a higher-level hierarchy than the first hierarchy. In some embodiments, data plane connectivity is configured through communication on a backplane. In some embodiments, a backplane and data plane comprise managed networks.

In some embodiments, systems, apparatuses, computer-implemented methods are described that include one or more of a hardware processor to execute instructions and a memory to store instructions, which when executed by the hardware processor cause a method to be performed, the method including selecting a first microservice of a first hierarchy, configuring the microservices of a second lower-level hierarchy to remove the first microservice from load balancing decisions to the first hierarchy, disabling data plane connectivity between the first microservice and microservices of the second hierarchy, and terminating the first microservice. In some embodiments, the first microservice is terminated by an existing microservice. In some embodiments, the existing microservice is a configuration microservice. In some embodiments, the first and existing microservices communicate over a backplane. In some embodiments, there exists, during the termination of the first microservice, a microservice of the same hierarchy level as the first microservice. In some embodiments, the load balancing decision utilizes information from microservices of a higher-level hierarchy than the first hierarchy. In some embodiments, data plane connectivity is configured through communication on a backplane. In some embodiments, a backplane and data plane comprise managed networks.

In some embodiments, systems, apparatuses, computer-implemented methods are described that include performing one or more of selecting a first microservice of a first hierarchy, configuring the microservices of a second lower-level hierarchy to remove the first microservice from load balancing decisions to the first hierarchy, moving the first microservice to another server, configuring data plane connectivity to the first microservice to reflect a change in server, and configuring the microservices of the second hierarchy to include the first microservice in load balancing decisions to the first hierarchy. In some embodiments, the first microservice was created by an existing microservice. In some embodiments, the existing microservice is a configuration microservice. In some embodiments, the first microservice and the microservices of a second lower-level hierarchy communicate over a backplane. In some embodiments, the first microservice is configured to use the data plane. In some embodiments, there exists, prior to the moving of the first microservice to another server, a microservice of the same hierarchy level as the first microservice. In some embodiments, the load balancing decision utilizes information from microservices of a higher-level hierarchy than the first hierarchy. In some embodiments, data plane connectivity is configured through communication on a backplane. In some embodiments, a backplane and data plane comprise managed networks.

In some embodiments, systems, apparatuses, computer-implemented methods are described that include performing one or more of creating a new microservice of a first hierarchy, configuring data plane connectivity between the new microservice and a microservice of a second, higher-level hierarchy, configuring data plane connectivity between the new microservice and a microservice of a third, lower-level hierarchy, and configuring the microservices of the third level of hierarchy to include the new microservice in load balancing decisions to the first hierarchy. In some embodiments, the new microservice is created by an existing microservice. In some embodiments, the existing microservice is a configuration microservice. In some embodiments, the new and existing microservices communicate over a backplane. In some embodiments, the new microservice is configured to use the data plane. In some embodiments, there exists, prior to a creation of the new microservice, a microservice of the same hierarchy level as the new microservice. In some embodiments, the load balancing decision utilizes information from microservices of a higher-level hierarchy than the first hierarchy. In some embodiments, data plane connectivity is configured through communication on the backplane. In some embodiments, the backplane and data plane comprise managed networks.

In some embodiments, systems, apparatuses, computer-implemented methods are described that include performing one or more of selecting a first microservice of a first hierarchy, configuring the microservices of a second, lower-level hierarchy to remove the first microservice from load balancing decisions to the first hierarchy, disabling data plane connectivity between the first microservice and microservices of the second hierarchy, and terminating the first microservice. In some embodiments, the first microservice is terminated by an existing microservice. In some embodiments, the existing microservice is a configuration microservice. In some embodiments, the first and existing microservices communicate over a backplane. In some embodiments, there exists, during the termination of the first microservice, a microservice of the same hierarchy level as the first microservice. In some embodiments, the load balancing decision utilizes information from microservices of a higher-level hierarchy than the first hierarchy. In some embodiments, data plane connectivity is configured through communication on a backplane. In some embodiments, a backplane and data plane comprise managed networks.

In some embodiments, systems, apparatuses, computer-implemented methods are described that include performing one or more of selecting a first microservice of a first hierarchy, configuring the microservices of a second lower-level hierarchy to remove the first microservice from load balancing decisions to the first hierarchy, moving the first microservice to another server, configuring data plane connectivity to the first microservice to reflect the change in server, and configuring a microservices of the second hierarchy to include the first microservice in load balancing decisions to the first hierarchy. In some embodiments, the first microservice was created by an existing microservice. In some embodiments, the existing microservice is a configuration microservice. In some embodiments, the first microservice and the microservices of a second lower-level hierarchy communicate over a backplane. In some embodiments, the first microservice is configured to use the data plane. In some embodiments, there exists, prior to the moving of the first microservice to another server, a microservice of the same hierarchy level as the first microservice. In some embodiments, the load balancing decision utilizes information from microservices of a higher-level hierarchy than the first hierarchy. In some embodiments, data plane connectivity is configured through communication on a backplane. In some embodiments, a backplane and data plane comprise managed networks.

In some embodiments, systems, apparatuses, computer-implemented methods are described that include executing computer executable instructions contained on a non-transitory computer-readable medium to cause the processor to perform one or more of creating a new microservice of a first hierarchy, configuring data plane connectivity between the new microservice and a microservice of a second, higher-level hierarchy, configuring data plane connectivity between the new microservice and a microservice of a third, lower-level hierarchy, and configuring the microservices of the third level of hierarchy to include the new microservice in load balancing decisions to the first hierarchy. In some embodiments, the new microservice is created by an existing microservice. In some embodiments, the existing microservice is a configuration microservice. In some embodiments, the new and existing microservices communicate over a backplane. In some embodiments, the new microservice is configured to use the data plane. In some embodiments, there exists, prior to a creation of the new microservice, a microservice of the same hierarchy level as the new microservice. In some embodiments, the load balancing decision utilizes information from microservices of a higher-level hierarchy than the first hierarchy. In some embodiments, data plane connectivity is configured through communication on a backplane. In some embodiments, a backplane and data plane comprise networks managed by the processor.

In some embodiments, systems, apparatuses, computer-implemented methods are described that include executing computer executable instructions contained on a non-transitory computer-readable medium to cause the processor to perform one or more of selecting a first microservice of a first hierarchy, configuring the microservices of a second lower-level hierarchy to remove the first microservice from load balancing decisions to the first hierarchy, disabling data plane connectivity between the first microservice and microservices of the second hierarchy, and terminating the first microservice. In some embodiments, the first microservice is terminated by an existing microservice. In some embodiments, the existing microservice is a configuration microservice. In some embodiments, the first and existing microservices communicate over the backplane. In some embodiments, there exists, during the termination of the first microservice, a microservice of the same hierarchy level as the first microservice. In some embodiments, the load balancing decision utilizes information from microservices of a higher-level hierarchy than the first hierarchy. In some embodiments, data plane connectivity is configured through communication on the backplane. In some embodiments, the backplane and data plane comprise networks managed by the processor.

In some embodiments, systems, apparatuses, computer-implemented methods are described that include executing computer executable instructions contained on a non-transitory computer-readable medium to cause the processor to perform one or more of selecting a first microservice of a first hierarchy, configuring the microservices of a second lower-level hierarchy to remove the first microservice from load balancing decisions to the first hierarchy, moving the first microservice to another server, configuring data plane connectivity to the first microservice to reflect a change in server, and configuring the microservices of the second hierarchy to include the first microservice in load balancing decisions to the first hierarchy. In some embodiments, the first microservice was created by an existing microservice. In some embodiments, the existing microservice is a configuration microservice. In some embodiments, the first microservice and the microservices of a second lower-level hierarchy communicate over the backplane. In some embodiments, the first microservice is configured to use 7e data plane. In some embodiments, there exists, prior to the moving of the first microservice to another server, a microservice of the same hierarchy level as the first microservice. In some embodiments, the load balancing decision utilizes information from microservices of a higher-level hierarchy than the first hierarchy. In some embodiments, data plane connectivity is configured through communication on the backplane. In some embodiments, the backplane and data plane comprise networks managed by the processor.

What is claimed is:

1. A computer-implemented method comprising:
    selecting a first security microservice of a first level of a hierarchy of security microservices, the first security microservice accepting serviced data from a second security microservice of a second lower-level of the hierarchy of security microservices;
    configuring the second security microservice of the second lower-level of the hierarchy of security microservices to remove the first security microservice from load balancing decisions to the first level of the hierarchy;
    moving the first security microservice to another server;
    configuring data plane connectivity to the first security microservice to reflect a change to the another server; and
    configuring the second security microservice of the second lower-level of the hierarchy to include the first security microservice in load balancing decisions to the second lower-level of the hierarchy.

2. The computer-implemented method of claim 1, wherein the first security microservice was created by an existing microservice.

3. The computer-implemented method of claim 2, wherein the existing microservice is a configuration microservice.

4. The computer-implemented method of claim 2, wherein the first security microservice of the first level of the hierarchy and the second security microservice of the second lower-level of the hierarchy communicate over a backplane.

5. The computer-implemented method of claim 4, wherein the first security microservice is configured to use the data plane.

6. The computer-implemented method of claim 5, wherein there exists, prior to the moving of the first security microservice to the another server, a microservice of a same hierarchy level as the first security microservice.

7. The computer-implemented method of claim 1, wherein the load balancing decisions utilize information from a third security microservice of a third higher-level of the hierarchy than the first level of the hierarchy.

8. The computer-implemented method of claim 7, wherein data plane connectivity is configured through communication on a backplane.

9. The computer-implemented method of claim 1, wherein a backplane and data plane comprise managed networks.

10. A non-transitory computer-readable medium storing instructions, which when executed by a processor cause the processor to perform a method, the method comprising:
    selecting a first security microservice of a first level of a hierarchy of security microservices, the first security microservice accepting serviced data from a second security microservice of a second lower-level of the hierarchy of security microservices;
    configuring the second security microservice of the second lower-level of the hierarchy of security microservices to remove the first security microservice from load balancing decisions to the first level of the hierarchy;
    moving the first security microservice to another server;
    configuring data plane connectivity to the first security microservice to reflect a change to the another server; and
    configuring the second security microservice of the second lower-level of the hierarchy to include the first security microservice in load balancing decisions to the second lower-level of the hierarchy.

11. The non-transitory computer-readable medium of claim 10, wherein the first security microservice was created by an existing microservice.

12. The non-transitory computer-readable medium of claim 11, wherein the existing microservice is a configuration microservice.

13. The non-transitory computer-readable medium of claim 11, wherein the first security microservice of the first level of the hierarchy and the second security microservice of the second lower-level of the hierarchy communicate over a backplane.

14. The non-transitory computer-readable medium of claim 13, wherein the first security microservice is configured to use the data plane.

15. The non-transitory computer-readable medium of claim 14, wherein there exists, prior to the moving of the first security microservice to the another server, a microservice of a same hierarchy level as the first security microservice.

16. The non-transitory computer-readable medium of claim 10, wherein the load balancing decisions utilize information from a third security microservice of a third higher-level of the hierarchy than the first level of the hierarchy.

17. The non-transitory computer-readable medium of claim 16, wherein data plane connectivity is configured through communication on a backplane.

18. An apparatus comprising:
a hardware processor to execute instructions; and
memory coupled to the processor, the memory to store the instructions which when executed by the processor cause:
selecting a first security microservice of a first level of a hierarchy of security microservices, the first security microservice to accept serviced data from a second security microservice of a second lower-level of the hierarchy of security microservices,
configuring the second security microservice of the second lower-level of the hierarchy of security microservices to remove the first security microservice from load balancing decisions to the first level of the hierarchy,
moving the first security microservice to another server,
configuring data plane connectivity to the first security microservice to reflect a change to the another server, and
configuring the second security microservice of the second lower-level of the hierarchy to include the first security microservice in load balancing decisions to the second lower-level of the hierarchy.

19. The apparatus of claim 18, wherein the first security microservice of the first level of the hierarchy and the second security microservice of the second lower-level of the hierarchy communicate over a backplane.

20. The apparatus of claim 18, wherein
the load balancing decisions utilize information from a third security microservice of a third higher-level of the hierarchy than the first level of the hierarchy.

* * * * *